May 2, 1967 A. B. FLY 3,316,985
UNDER-REAMING MACHINE
Original Filed Dec. 23, 1959 15 Sheets-Sheet 1
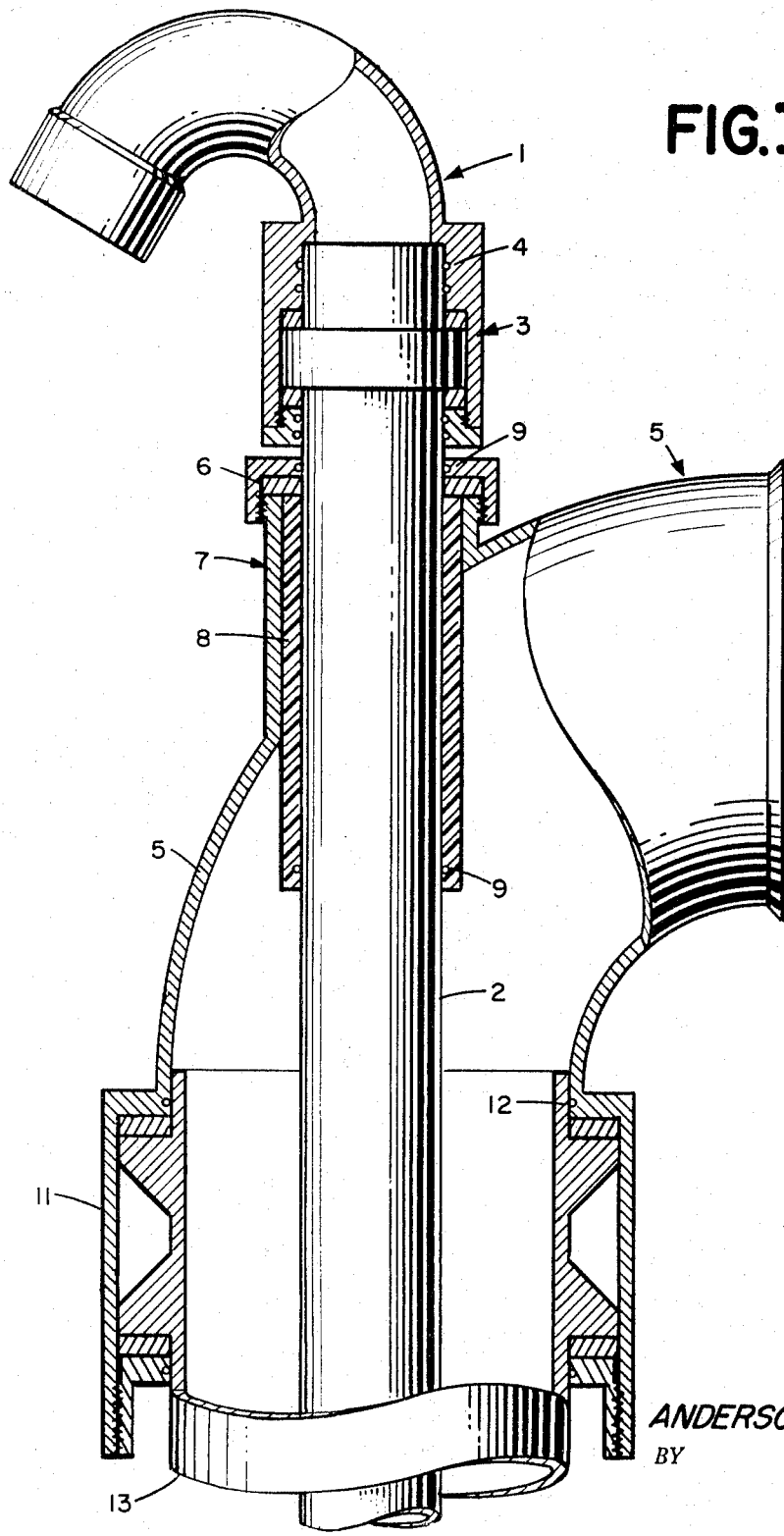
FIG. I
INVENTOR.
ANDERSON BILLY FLY
BY
ATTORNEY

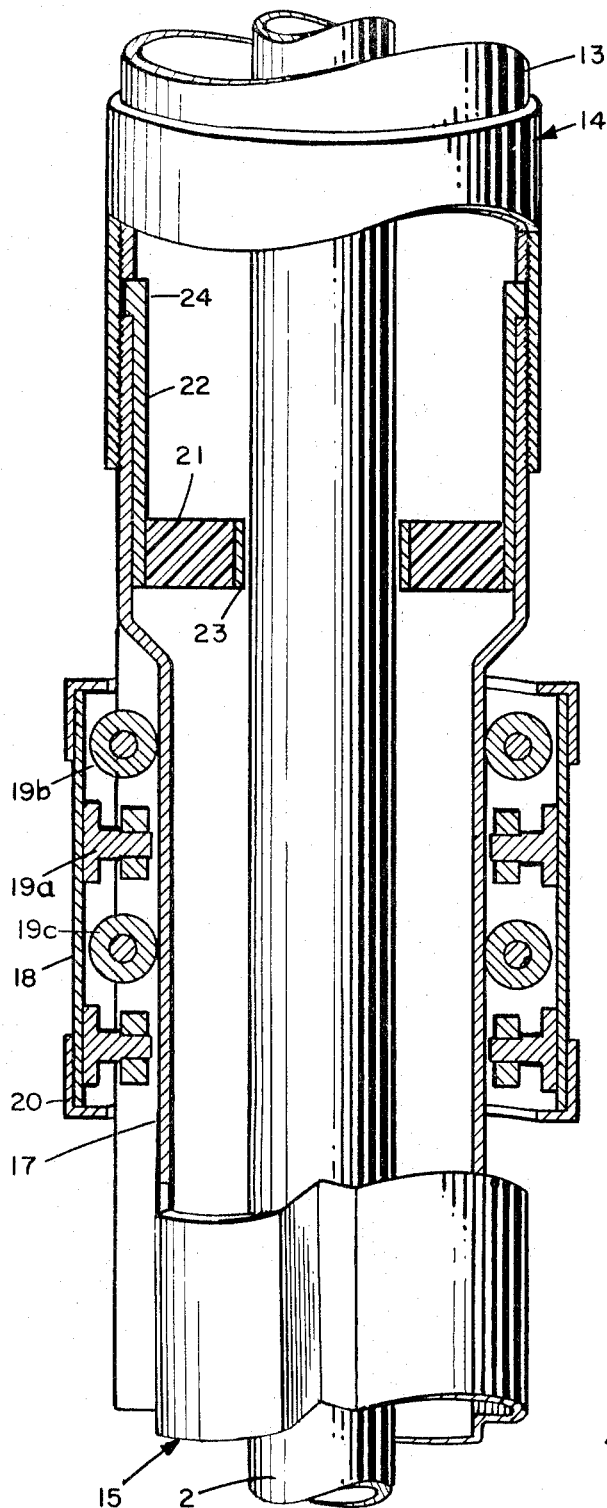

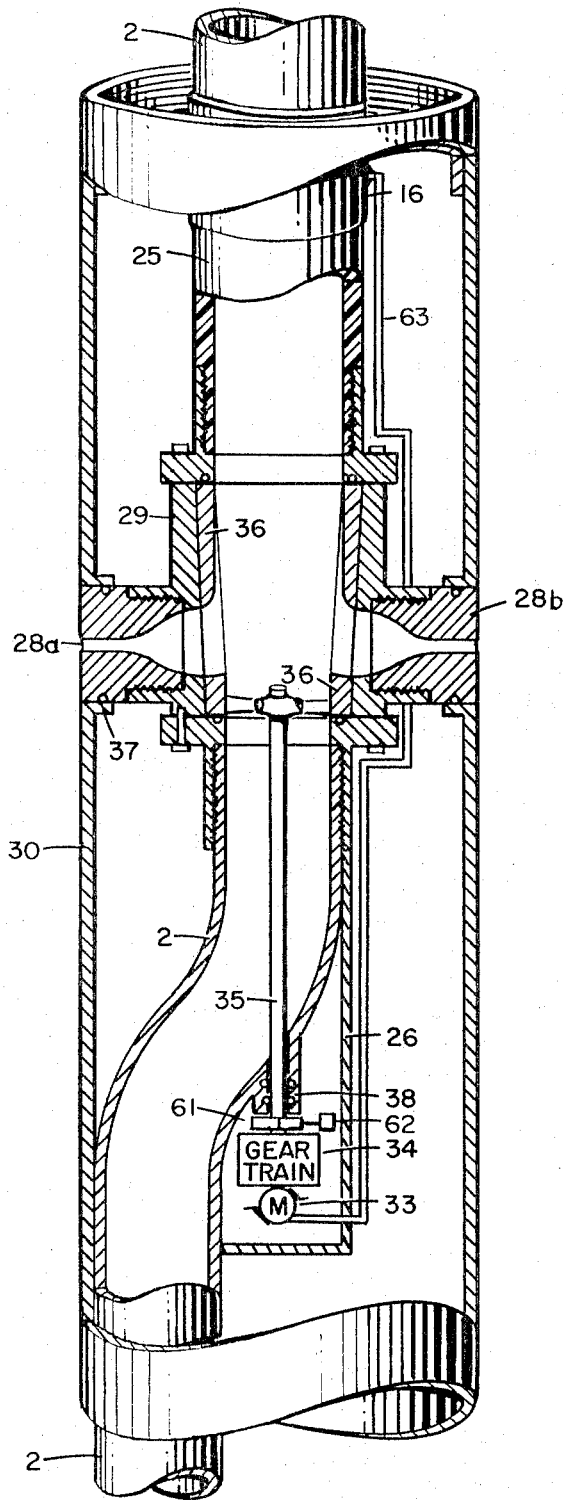

May 2, 1967     A. B. FLY     3,316,985
UNDER-REAMING MACHINE
Original Filed Dec. 23, 1959     15 Sheets-Sheet 4
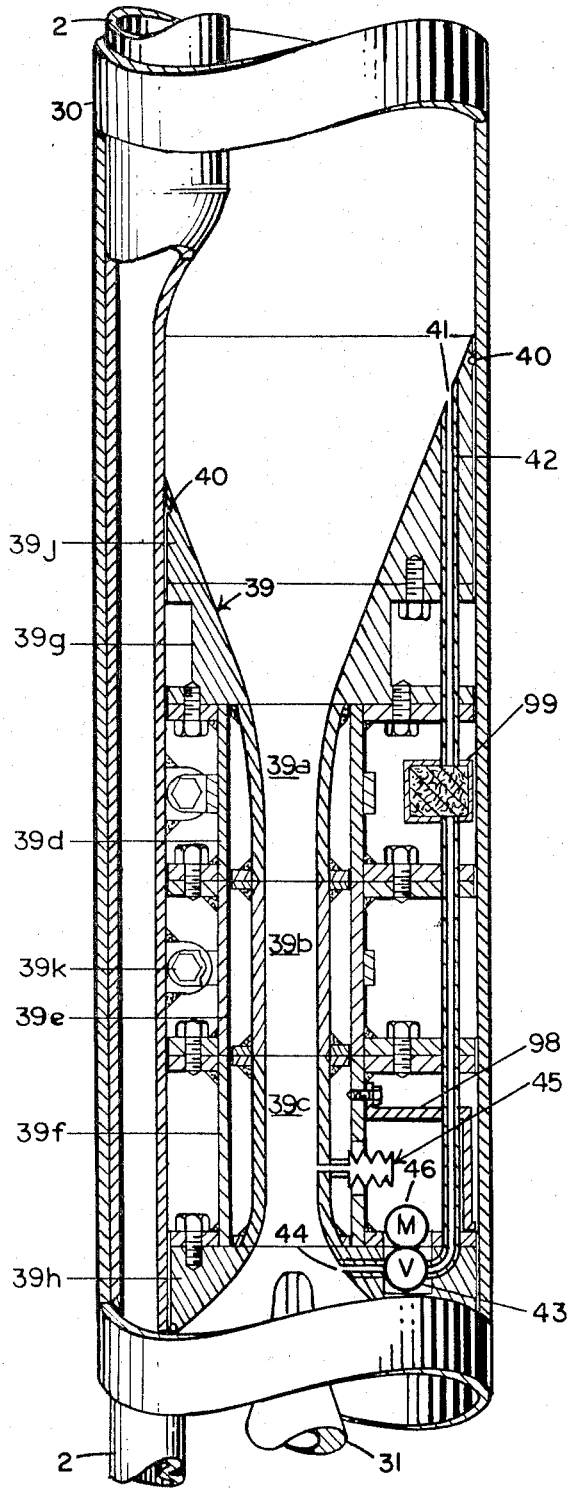
FIG. IV
INVENTOR.
*ANDERSON BILLY FLY*
BY
ATTORNEY May 2, 1967  A. B. FLY  3,316,985
UNDER-REAMING MACHINE
Original Filed Dec. 23, 1959  15 Sheets-Sheet 5
FIG. V
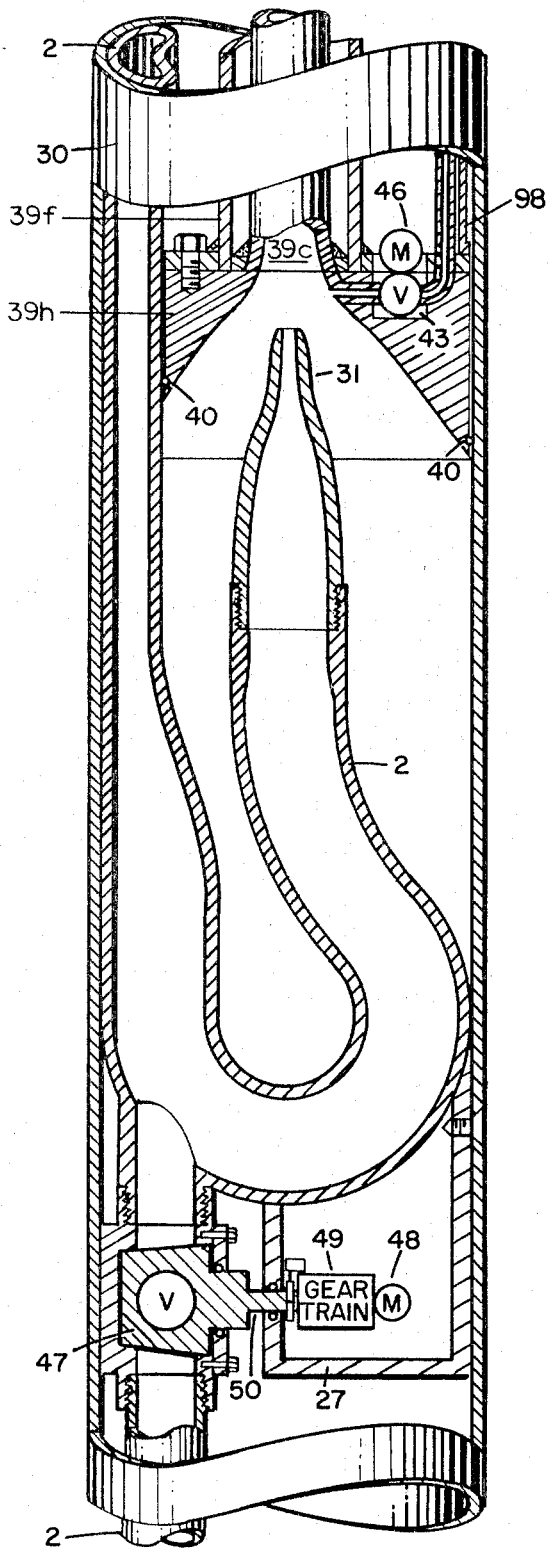
INVENTOR
*ANDERSON BILLY FLY*
BY
ATTORNEY

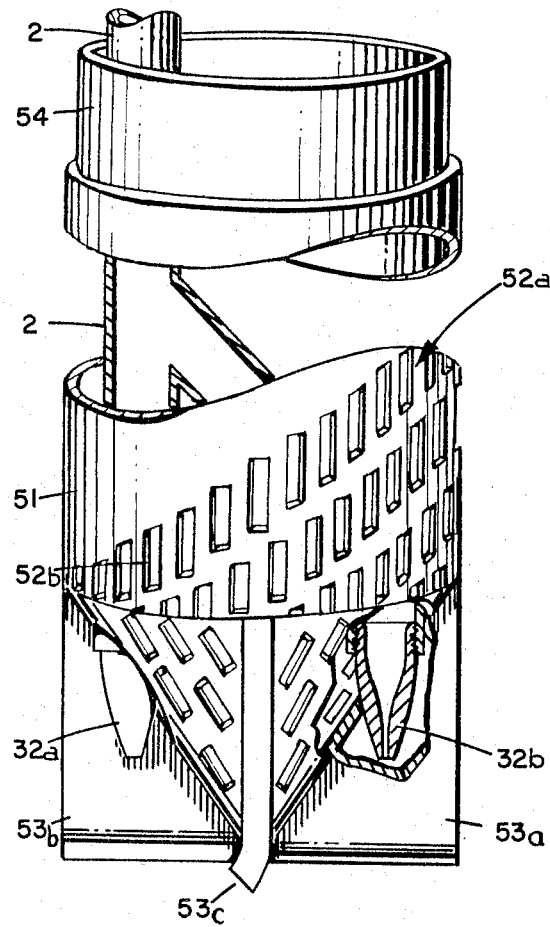

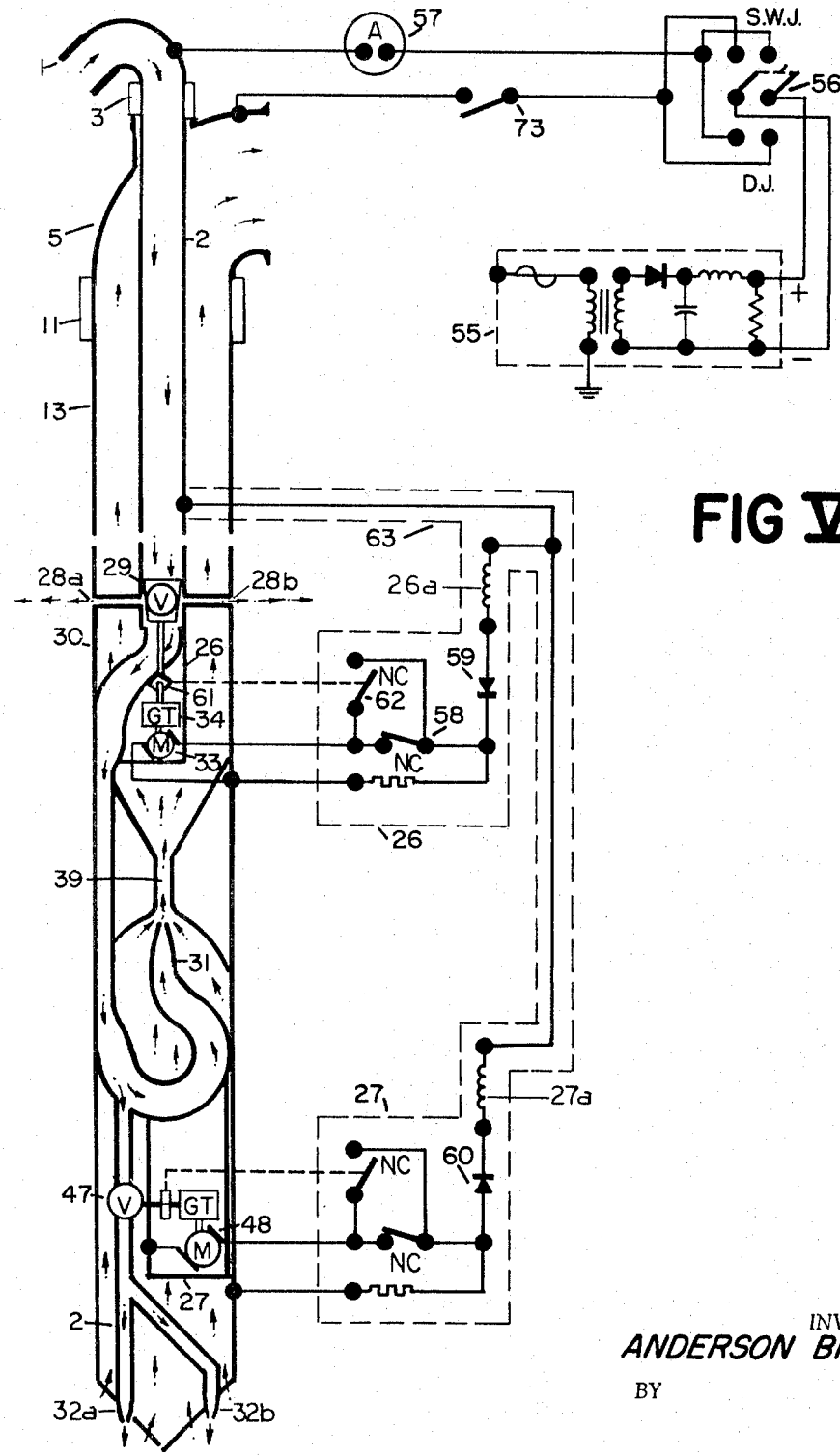

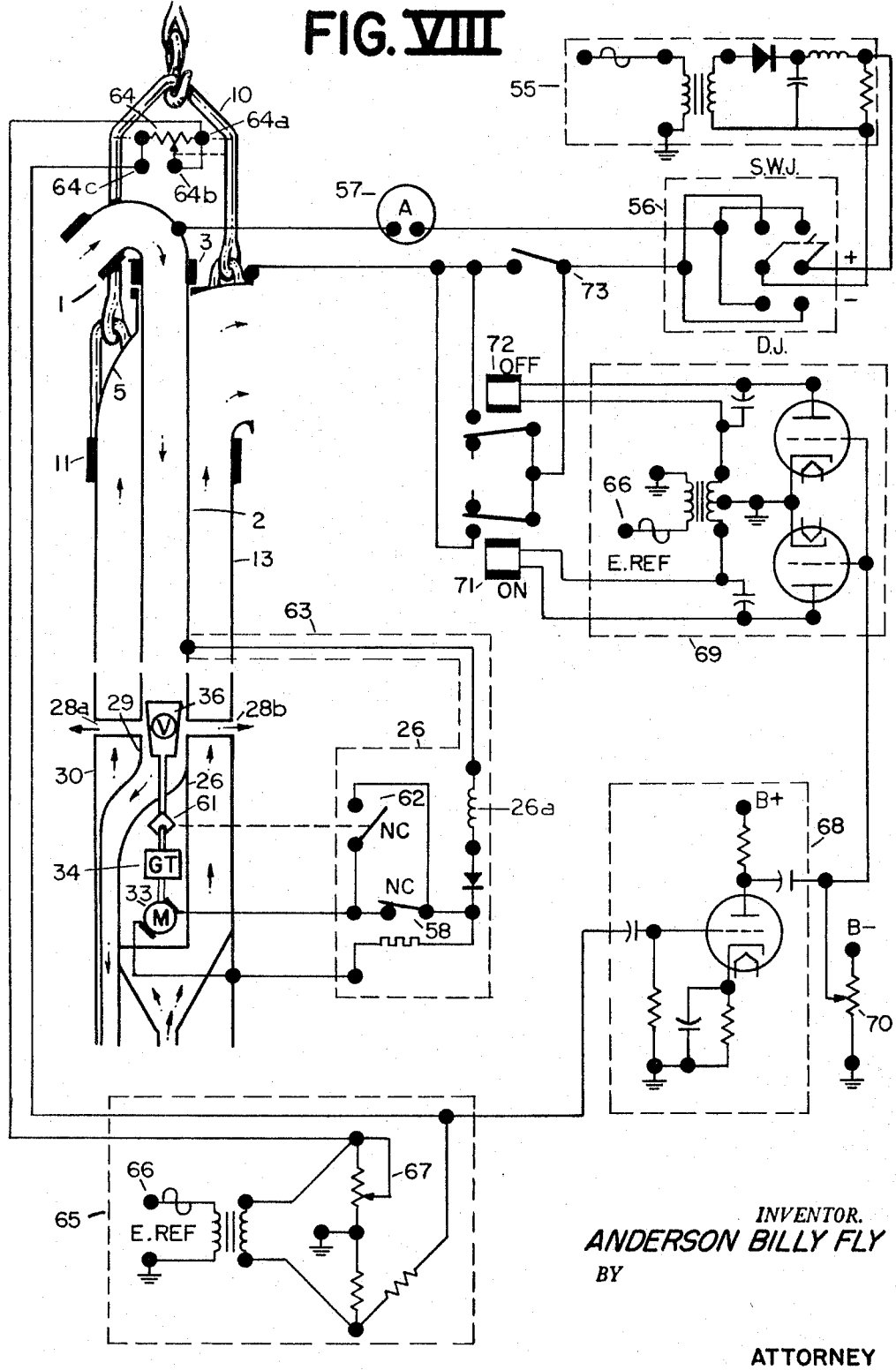

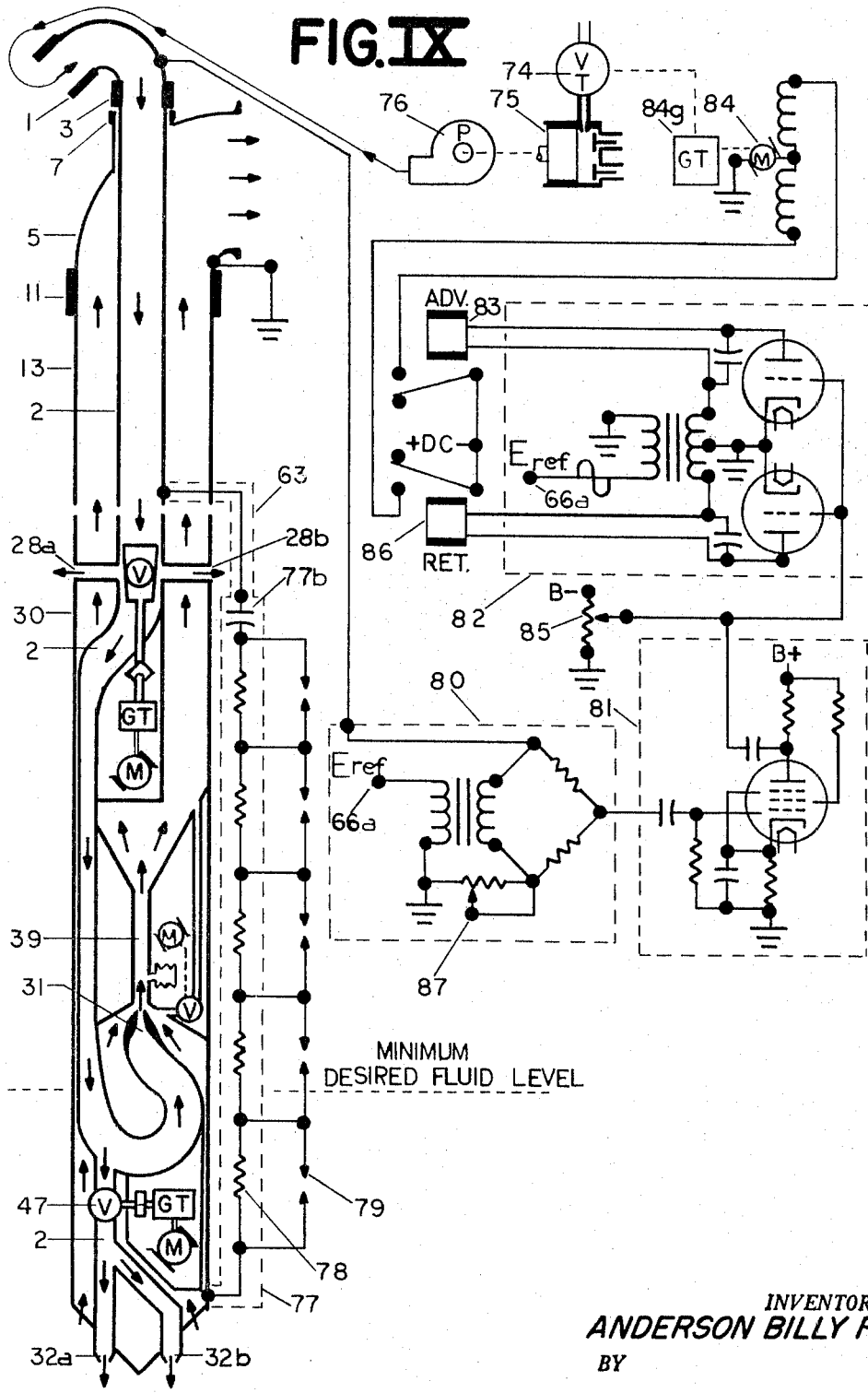

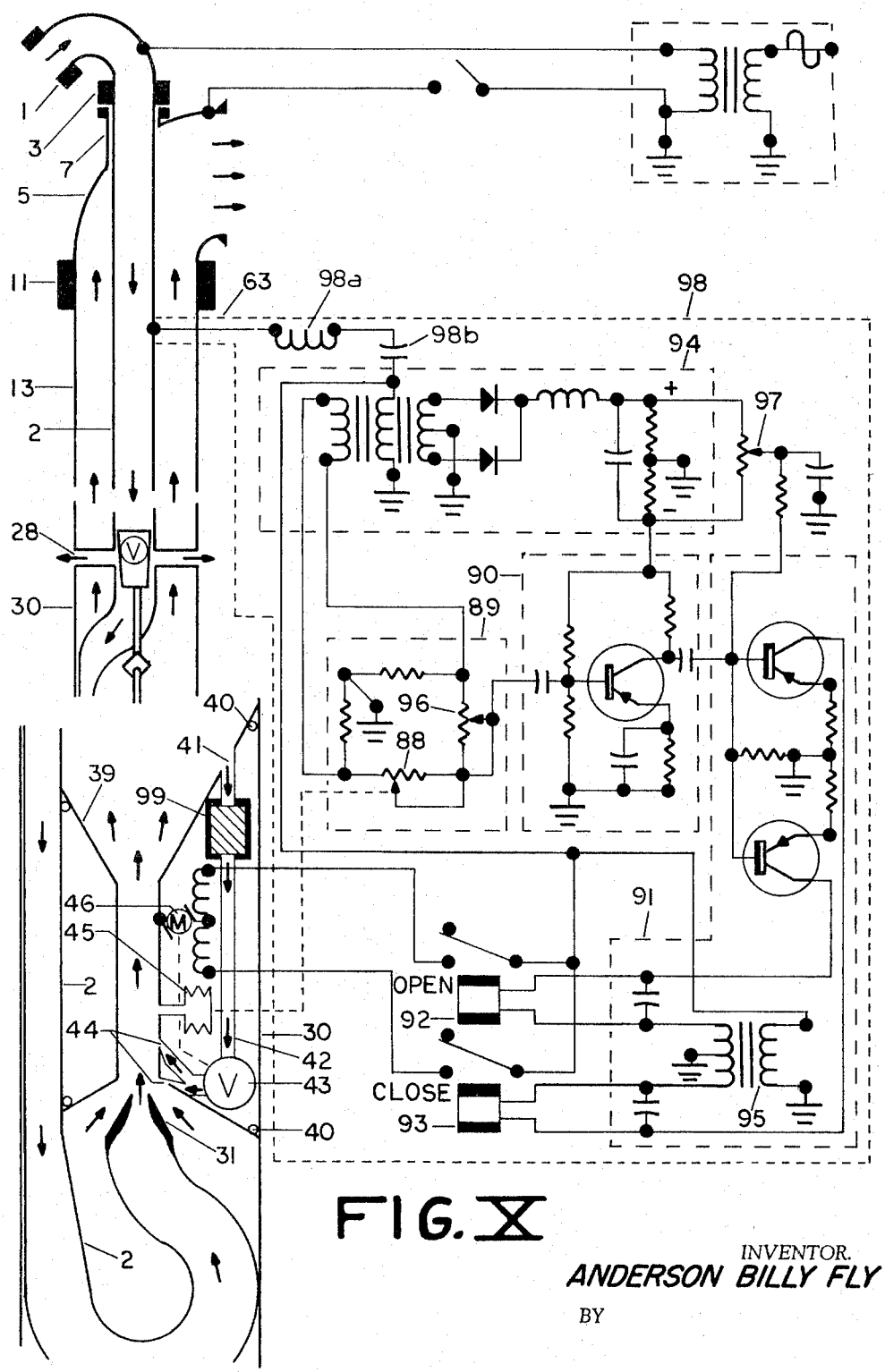
FIG. X
INVENTOR.
*ANDERSON BILLY FLY*
BY
ATTORNEY

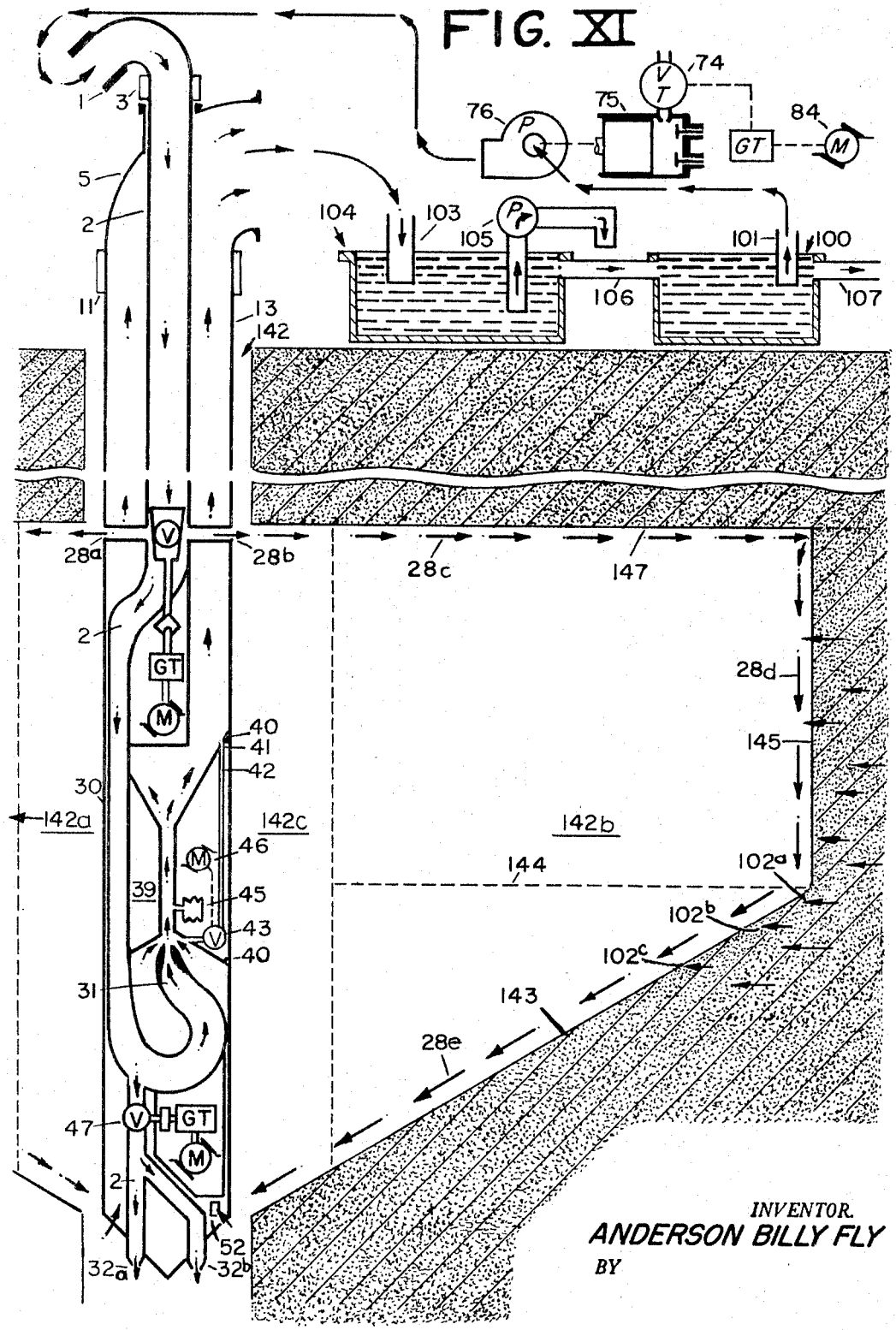

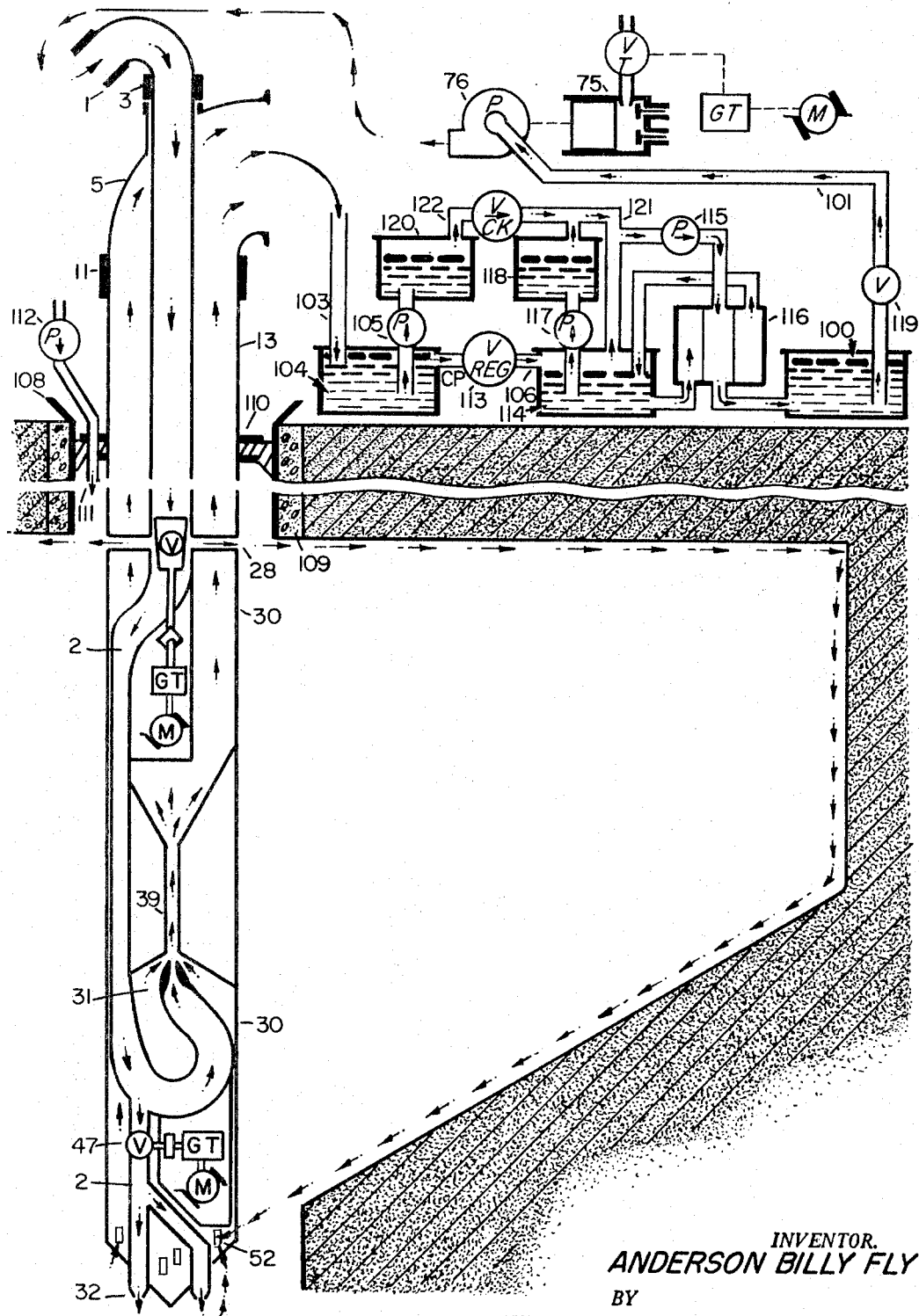
FIG. XII
INVENTOR.
ANDERSON BILLY FLY
BY
ATTORNEY

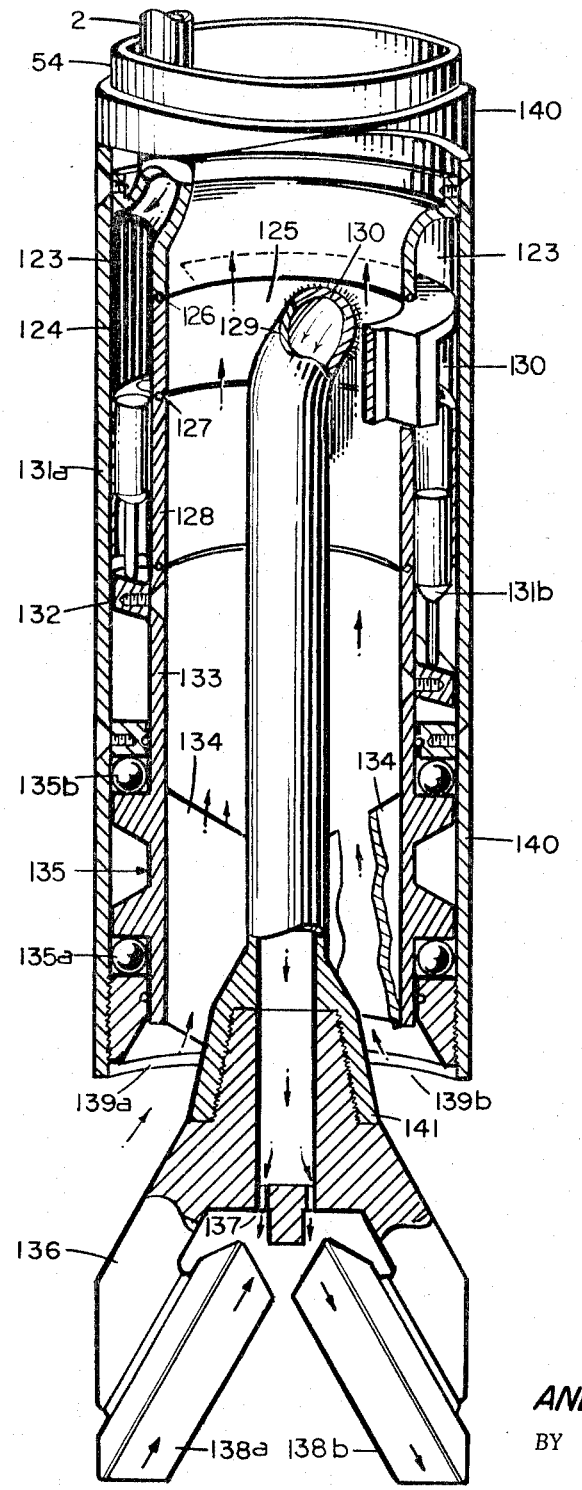
FIG. XIII

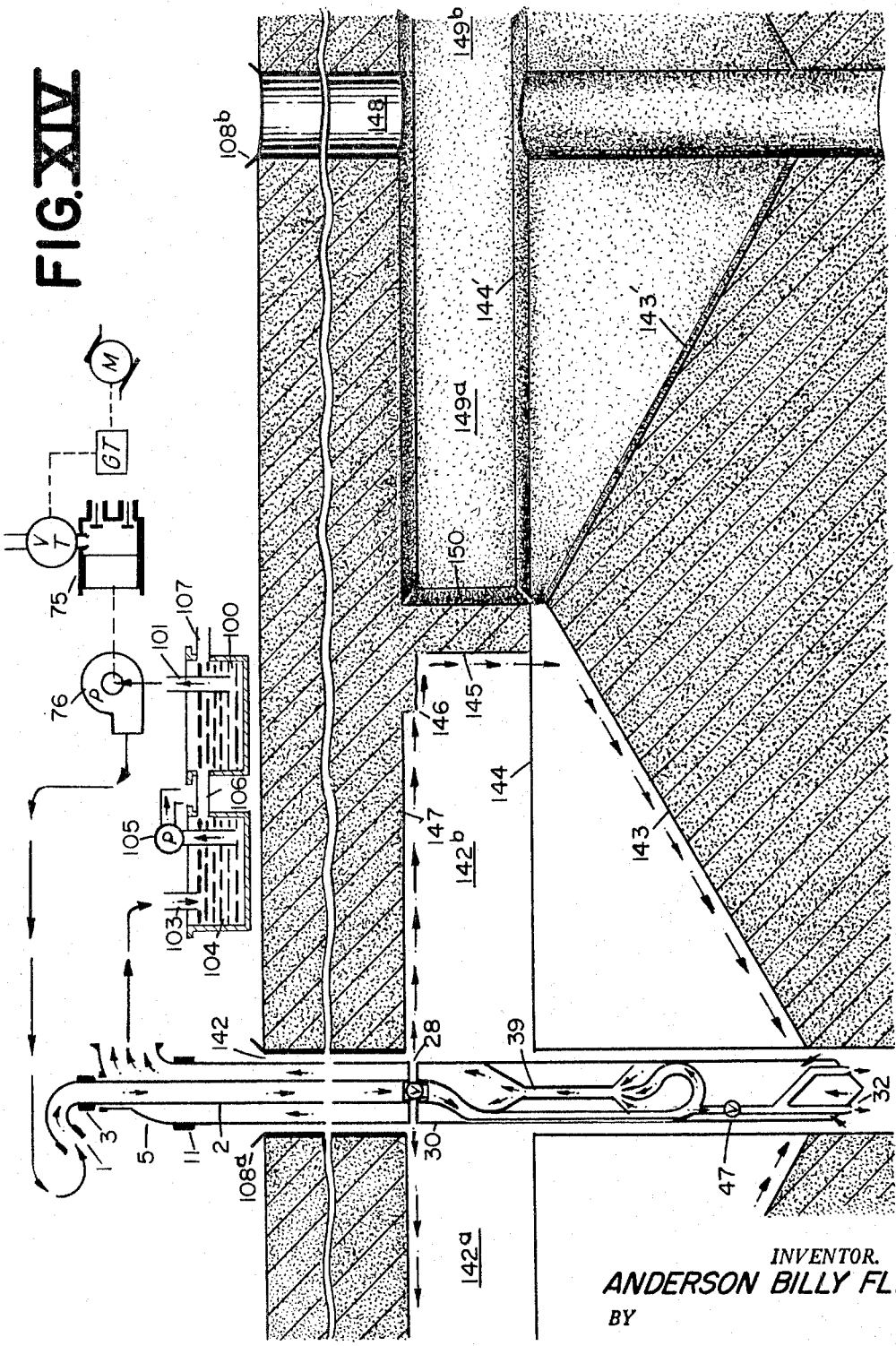

May 2, 1967   A. B. FLY   3,316,985
UNDER-REAMING MACHINE
Original Filed Dec. 23, 1959   15 Sheets-Sheet 15
FIG. XV
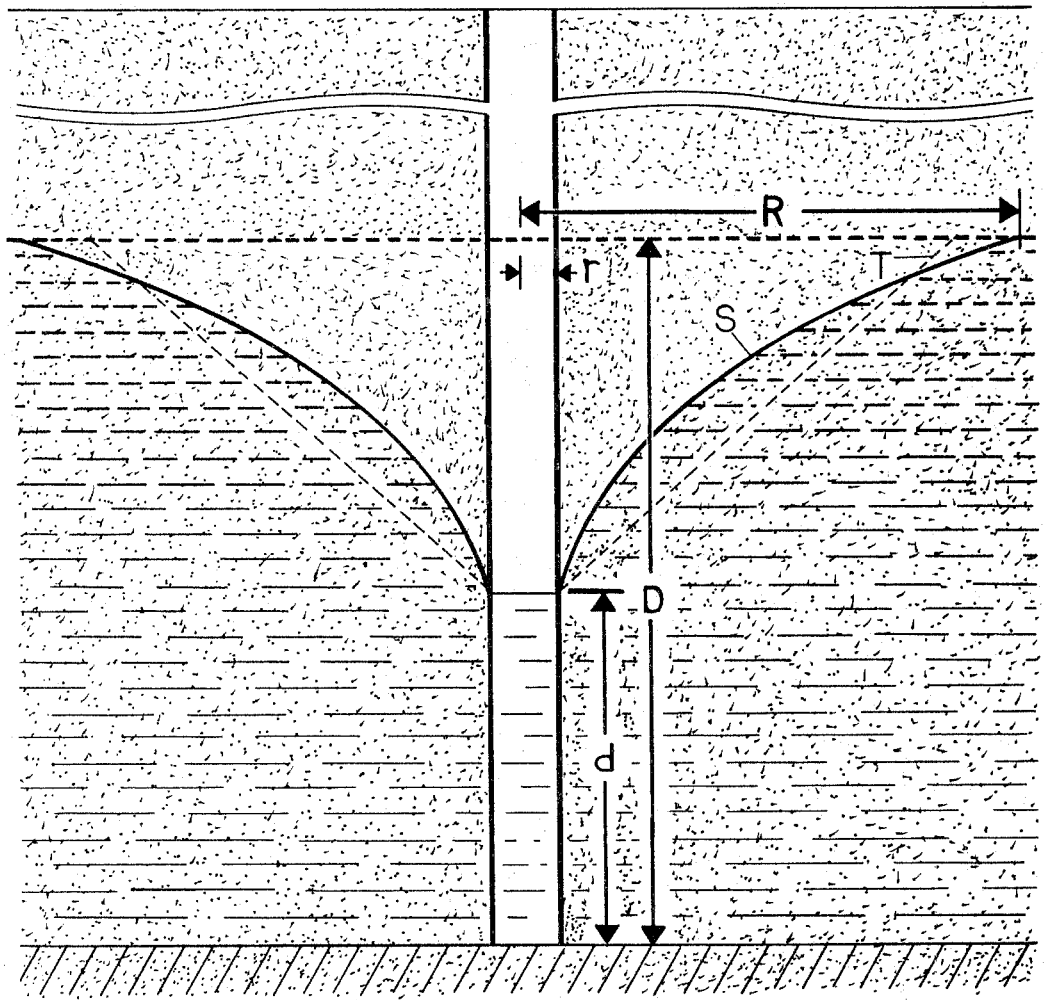
INVENTOR.
ANDERSON BILLY FLY
BY
ATTORNEY

United States Patent Office 3,316,985
Patented May 2, 1967

3,316,985
UNDER-REAMING MACHINE
Anderson Billy Fly, Amarillo, Tex., assignor to Hydro-Jet Services, Inc., Amarillo, Tex., a corporation of Texas
Original application Dec. 23, 1959, Ser. No. 861,557, now Patent No. 3,155,177. Divided and this application Dec. 18, 1963, Ser. No. 331,435
8 Claims. (Cl. 175—24)

This invention relates to under-reaming machines and more particularly to a machine for hydraulically under-reaming the sidewalls of a well or bore.

This is a division of my co-pending application Ser. No. 861,557 filed Dec. 23, 1959, now United States Patent 3,155,177 issued Nov. 3, 1964.

Since the under-reaming of a well or bore is desirable to increase the fluid production of the well or bore, to controllably cut out and remove to the surface material in a desired formation and to construct stable cavities, voids, or tunnels of a desired size, shape, and depth in the sidewalls of a well or bore, it is necessary to construct a machine that can be conveniently lowered down the well or bore in order to cut, wash, fracture, or otherwise controllably and reliably remove materials from and in the vicinity of the walls of the well or bore and return these materials to the surface.

It is a further object of the present invention to provide a machine having a sidewall cutting device for cutting, washing, fracturing, or otherwise removing materials from and in the vicinity of the sidewalls of a well or bore in combination with a pumping device to remove the cuttings and fluids from the well or bore as fast as they accumulate. Further, a drilling device is provided to cooperate with the above-mentioned item in order to deepen the well or bore as necessary as well as to agitate cuttings that may collect in the bottom of the well or bore.

Further objects of the present invention are to provide a machine to operate at any desired depth; to controllably cut at high rates into the sidewalls of the well or bore in a desired and controlled direction; to pump large quantities of fluids and cuttings to the surface without material damage to the pumping device; to conveniently drill the well or bore deeper and to agitate the cuttings that collect in the bottom of the well or bore to permit their removal to the surface by the pumping device.

It is a further object of the present invention to provide a machine capable of constructing subsurface tunnels. Subsurface tunnels are desirable to transport fluids through impervious formations, to collect fluids from great distances in pervious formations and to serve as subsurface roadways or conduits. The machine is used to cut lateral tunnels into the sidewalls of a well or bore at the desired depth and direction to the maximum lateral range of the sidewall cutting device. Another well or bore is constructed at a distance twice the maximum lateral range and directly in line with the lateral tunnel previously constructed. By orienting the sidewall cutting device in depth and azimuth, the lateral tunnels cut into the sidewalls of the second well or bore are made to join the original tunnel. By use of succesive wells or bores a continuous tunnel of desired length, direction and depth can be constructed.

A further object of my invention is to provide a drilling device which allows drilling through hard formations, drilling of large angular deviations from the vertical, and providing rotation of the drilling device while the guiding mechanism therefor does not rotate.

Other objects, purposes and characteristics features of present invention will be in part obvious from the accompanying drawings and in part pointed out as the description of the invention progresses.

In describing the invention in detail, reference will be made to the accompanying drawings, in which like reference characters designate corresponding parts throughout the several views, in which:

FIGURE I is a side view—broken away in part— of the hydraulic fluid supply line swivel and the hydraulic jet pump discharge line swivel:

FIGURE II is a side view broken away in part to show a cross section of the kelly and drive bushing assembly;

FIGURE III is a side view broken away in part to show a cross section of the hydraulic sidewall cutting device and motor valve assembly;

FIGURE IV is a side view broken away in part to show a cross section of the venturi section of the hydraulic jet pumping device located immediately below the section shown in FIGURE III.

FIGURE V is a side view broken away in part to show a cross section of the lower portion of the hydraulic jet pumping device and the hydraulic drilling device motor-valve assembly.

FIGURE VI is a side view broken away in part to show a cross section of the hydraulic drilling device employing drilling jets.

FIGURE VII is a diagrammatic illustration of the electrical system controlling the hydraulic sidewall cutting jet motor-valve and the hydraulic drilling jet motor-valve assemblies.

FIGURE VIII is a diagrammatical illustration of the cutting rate control system.

FIGURE IX is a diagrammatical illustration of the fluid level control system.

FIGURE X is a diagrammatical illustration of the jet pump cavitation control system.

FIGURE XI is a diagrammatical illustration showing the flow of fluid in operation of the integrated machine and process of my invention.

FIGURE XII is a diagrammatical illustration showing the flow of fluid in operation of the integrated machine employing petroleum gases as hydraulic fluid.

FIGURE XIII is a side view broken away in part of the hydraulic drilling device of this invention which employs a hydraulic motor to drive a conventional roller bit.

FIGURE XIV is a diagrammatical illustration of the continuous tunneling method.

FIGURE XV is a diagrammatic representation of factors involved in well production.

For the purpose of simplifying the illustrations and facilitating in the explanation, the various parts constituting the embodiments of the invention have been shown diagrammatically or in their more simple form, and in some cases conventional illustrations have been employed rather than showing all of the details of a structure which actually would be employed in practice, the drawings having been made more with the purpose in mind of making it easy to understand the purposes and modes of operation of the invention than with the idea of illustrating the specific structure and design of parts known to those skilled in the art in which the parts would be employed in practice.

Referring to FIGURES I, II, III, IV, V, and VI of the drawings, it will be noted that these figures are arranged in sequence as the parts of the assembled machine would be arranged extending from above the surface down into the well or bore.

Generally speaking, and without limitations of the scope of the invention, one embodiment of the apparatus provides in an operative connection, a hydraulically powered cutting device, a hydraulically powered pumping device, and a hydraulically powered drilling device, all combined into one integrated machine. The hydraulically powered cutting device comprises a plurality of horizontally mounted sidewall cutting jets which are adapted to be moved up or down vertically, and be controllably rotated clockwise or counter-clockwise in azimuth while performing the cutting operation. Associated with this hydraulically powered cutting device is a hydraulic fluid supply line leading from a high pressure surface pump down the well or bore to the cutting device. The supply line, together with the cutting device, can be raised or lowered in the well or bore with surface hoisting equipment. The supply line is equipped with a swivel located above the surface to permit rotation of the cutting device. An electrically powered motor-valve assembly is used in combination with this cutting device to provide surface control of the sidewall cutting operation. The electrical motor-valve assembly thereby can be operated from the surface to start or stop the cutting operation as desired.

The hydraulic fluid supply line in this apparatus also powers a hydraulic jet pumping device located below the hydraulically powered cutting device and attached thereto. The hydraulic jet pumping device comprises essentially of the operative series connection, a hydraulic fluid supply line, a pump jet, a high velocity venturi, jet pump suction line, jet pump housing, jet pump discharge line leading to the surface, and a jet pump discharge line swivel located above the surface of the ground. The hydraulic jet pumping device removes the fluids and cuttings from the well or bore as fast as these materials accumulate and is controlled to maintain the fluid level in the well or bore below horizontally mounted sidewall cutting jets in order to permit optimum cutting rate and cutting distance into the material of walls of the well or bore and in the vicinity thereof. The pumping rate or discharge rate of the hydraulic jet pumping device is controlled by varying the pressure of the hydraulic fluid supplied to the pump jet. The pumping rate is maintained sufficiently high to keep the fluid level in the well or bore below the hydraulic cutting device and to maintain a sufficient fluid velocity ascending through the jet pump discharge line to transport cuttings therein to the surface.

The hydraulic fluid supply line also powers the hydraulic drilling device which is located below the hydraulic jet pumping device and is attached to the lower end of the jet pump housing. The hydraulic drilling device comprises in operative connection, the hydraulic fluid supply line, an electrically powered motor-valve assembly to control the drilling operation, two drilling jets arranged to discharge in a downward direction, and the drilling device housing. The drilling device housing is perforated to allow entrance of fluids and cuttings to the jet pump suction line. The two drilling jets operate to drill the well or bore deeper as desired, and to agitate the cuttings that collect in the bottom of the well or bore. The drilling device electrical motor-valve assembly is operated from the surface to start or stop the drilling operation as desired. The drilling operation and the sidewall cutting operation both can be started and stopped independently. This arrangement permits four modes of operation; the jet pump can be operated alone to measure the fluid yields of a formation; the jet pump and drilling jets can be used in combination to drill and pump simultaneously; the jet pump and sidewall jets can be used in combination for under-reaming; the jet pump, drilling jets, and sidewall jets can be used for pumping, drilling, and under-reaming simultaneously.

The hydraulic fluid supply line passes through the vertical center line of the jet pump discharge line swivel and down the center of the jet pump discharge line to supply the various units heretofore mentioned. Since both of these lines are equipped with swivels that have a common vertical center line, the entire assembly can be rotated by applying torque to the uppermost section of the jet pump discharge line. This section of the jet pump discharge line is called the kelly and is equipped with four vertical tracks recessed into the walls of the pipe. A square drive bushing rides up or down on these four tracks. Torque applied to the drive bushing by a conventional rotary table provides rotational movement of the lower portion of the assembly. This arrangement provides that the sidewall cutting jets and the drilling jets may be conveniently raised or lowered the length of the vertical tracks and may be rotated simultaneously.

The hydraulic fluid supply line tube is insulated electrically from the jet pump discharge line swivel, from the jet pump discharge line tube, and from the sidewall cutting jet assembly. That tube serves as one conductor for an electrical system supplying the sidewall cutting jet motor-valve assembly and the drilling jet motor-valve assembly. This arrangement permits operation of these electrical motor-valve assemblies without the obvious disadvantage of handling an additional electrical conduit. Selective operation of the motor-valve assemblies with a two conductor electrical system is provided by reversing polarity of an ungrounded direct current power supply and placing rectifiers in series with the D.C. motor windings.

The rate of removal of material from and in the vicinity of the walls of the well or bore is known as the cutting rate thereof. Cutting rates of the various formations by the above-mentioned hydraulic cutting device will vary widely; removal of such formation by the action of the cutting device accordingly may exceed the solids capacity of the jet pumping device; thus it is necessary to determine the cutting rate of such formation by the device above referred to and provide a control system to maintain the maximum cutting rate of such formation within allowable limits. The gross suspended weight of the machine when operating is the sum of the dry weight of the machine suspended, the weight of the fluid required to fill the hydraulic fluid supply line and the jet pump discharge line, the net downward reaction thrust of the pump jet stream, and the fluid weight of cuttings suspended in the jet pump discharge line at any given time, less the upward reaction thrust of the drilling jets if they are being operated. The upward thrust of the fluid moving upward in the discharge line towards the discharge swivel is, for practical purposes, negligible. Since the reaction thrust of the jets is essentially a function of their size and the hydraulic fluid pressure applied, the only unknown factor comprising the gross suspended weight is the fluid weight of the suspended cuttings in the jet pump discharge line. Thus, the cutting rate is determined by subtracting all known or calculable factors from the gross weight. This information is used to control the operation of the sidewall cutting jets by moving the motor-valve of the motor-valve assembly towards the OFF or closed position when the cutting rate becomes excessive, and to return the motor-valve of the motor-valve assembly towards the ON or full open position when the weight of the suspended solids in the jet pump discharge line drops back within the predetermined allowable limits.

The fluid level in the well or bore must be maintained below the sidewall cutting jets and above the jet pump suction openings for optimum operation. The fluid level in the well is measured by an electrical bridge network, one leg of which is located on the jet pump housing below the sidewall jets and above the jet pump section opening. This measurement is used to control the throttle setting of the engine powering the high pressure hydraulic fluid supply pump. By thus controlling the discharge pressure of the hydraulic fluid supply pump, supplying fluid to the swivel, the pumping rate of the jet pumping device is also regulated to maintain the desired fluid level in the well or bore.

Since the hydraulic jet pumping device is subject to cavitation at the extreme venturi velocities that are needed for maximum pumping depths, it is necessary to measure the absolute pressure in the venturi throat and to provide a control system to maintain this pressure within allowable operable limits. If the absolute pressure in the venturi throat drops below the vapor pressure of the hydraulic fluid being used, cavitation will occur. Thus, it is necessary to consider the type and temperature of the hydraulic fluid being used, in order to establish no less than minimum allowable absolute pressure in the throat of the venturi. Absolute pressure in the throat of the venturi is measured by an electrical transducer and this measurement is used to control the rate of fluid feedback from a high pressure section of the venturi to the areas of the venturi throat that are subject to cavitation. The injection of small amounts of high pressure fluids into the venturi throat area, when the absolute pressure in this area otherwise drops, will increase the maximum allowable velocity through the venturi.

Fluid and cuttings being pumped from the well or bore from the jet pump discharge line by the jet pumping device are discharged into surface reservoirs where the cuttings are separated out from the fluid and the fluids are returned to and reused by the high pressure hydraulic fluid supply pump. If the well or bore is producing fluid, the excess fluid is discharged over the side of the surface reservoirs and is wasted or otherwise disposed of. This arrangement permits the use of the machine in under-reaming both fluid producing and non-fluid producing formations.

Hydraulic fluids of various types may be used with the present invention. Water will be used in most instances on water producing or non-fluid producing formation. Warm water or warm diesel fuel is contemplated for use in under-reaming glacier ice or permafrost formations to prevent the cuttings from congealing during the pumping operation or in the surface reservoirs. Dilute acid or alkaline fluids will be used to aid the under-reaming operation in limestone or sticky shale formations. By pressurizing the surface reservoirs, the hydraulic fluid pressure pump liquor supply, jet pump discharge line, and the annular space between the jet pump discharge line and the well casing as below described in detail, liquified petroleum gases such as propane or butane may be used to aid in under-reaming tar sand formations.

In another form of the present invention, the same hydraulically powered sidewall cutting device and hydraulically powered jet pumping device are used as above described; but the hydraulically powered drilling device is modified to provide for attachment of a drilling device including a conventional roller bit to provide a machine to drill through the harder formations, to drill at large angular deviations from the vertical, and to provide independent rotation of the drilling device from a non-rotating support and position. In this aspect of my invention, the hydraulic drilling device comprises a hydraulic fluid supply line, the electrically powered motor-valve assembly to control the drilling operations, a hydraulic motor which applies rotational torque to a conventional roller bit, a roller bit hydraulic fluid supply line which conducts the waste fluid from the hydraulic motor to the discharge nozzles of the roller bit. Entrance of the cuttings from the well or bore to the jet pump suction is provided by permitting the cuttings to pass through an annular space provided between the roller bit hydraulic fluid supply line and the output shaft of the hydraulic motor. The gross suspended weight of the machine or any portion thereof can be applied to the roller bit to facilitate optimum drilling rates.

In drilling wells or bores at large angular deviations from the vertical, the drilling assembly housing and the jet pump housing serve as a pilot to support the vertical component of the gross weight of the machine. The hydraulic sidewall cutting device and the hydraulic jet pumping device are generally not rotated when drilling at large angular deviations. The reaction thrust of the pump jet comprises a large percent of the gross weight of the machine and is always applied along the center line of the machine regardless of its alignment with the true vertical. Thus, considerable weight can be applied to the roller bit in drilling wells or bores at large angular deviations. The hydraulic sidewall cutting device can be used to under-ream the sidewalls of a well or bore that has been drilled at the desired angular deviation and these lateral cuts may be made in the horizontal plane or in a desired plane other than horizontal by orienting the hydraulic sidewall cutting device in azimuth.

Referring to FIGURE I of the drawings, the hydraulic fluid supply line swivel 1 connects to a conventional high pressure flexible hose, not shown, which allows the entire machine to be raised or lowered, and is equipped with a swivel bearing assembly 3 that permits rotation of the hydraulic fluid supply line 2 while the swivel may remain in a fixed position. High pressure seals as at 4 are provided to prevent leakage of the hydraulic fluids from the supply line swivel 1. The hydraulic fluid supply line tube 2 is shown passing down the center of the jet pump discharge line swivel 5. The jet pump discharge line swivel 5 is supported, and raised or lowered by a conventional hoisting unit through a cable and hook attached to the conventional swivel bail 10 (FIGURE VIII). The jet pump discharge line swivel 5 in turn supports the gross suspended weight of the entire machine and is equipped with a swivel bearing assembly 11 which permits rotation of the jet pump discharge line 13 relative thereto. High pressure seals 12 are provided to prevent leakage of cuttings and fluids into and through the swivel bearing assembly 11. The packing gland assembly 7 is equipped with a bearing assembly 6 to permit rotation of the hydraulic fluid supply line 2 in relation to the jet pump discharge line swivel 5. High pressure electrically insulating seals 9 are provided to prevent leakage of cuttings and fluids through the packing gland 7. The packing gland 7 is lined with a non-conducting plastic sleeve 8 in order to electrically insulate the hydraulic fluid supply line 2 from the jet pump discharge line swivel 5. The metallic hydraulic fluid supply line tube 2, made of conventional oil well tubing steel (4 inch inside diameter, 4½ inch outside diameter, API line pipe grade J is the preferred embodiment below described in detail), serves as one conductor and the metallic jet pump discharge line tube 13 made of conventional tubing steel (mild steel, water well turbine pump column pipe, inside diameter 10 inches, outside diameter 10¾ inches is the preferred embodiment below described in detail) as the other conductor in the electrical system supplying the various control systems herein described.

Referring to FIGURE II, it will be seen that a threaded coupling 14 is provided for attaching the kelly 15 to the section of the jet pump discharge line tube 13 extending downward from the jet pump discharge line swivel 5. In a similar manner threaded couplings 16 (FIGURE III) and additional sections of the hydraulic fluid supply line tube 2 are attached to extend the hydraulic fluid supply line tube 2. Four vertical tracks, as 17, are recessed into the wall of the kelly, 15. A square drive bushing assembly 18 moves up or down along the vertical tracks 17 on sixteen drive bushing bearing assemblies, as 19a, 19b, and 19c which permit the drive bushing 18 to move up or down freely under operating loads. Two drive bushing bearing assemblies, as 19b and 19c, bear against each of the eight faces of the vertical tracks 17, and transmit the rotational torque applied to the drive bushing 18, by a conventional rotary table, which engages the lower drive bushing flange 20 in the conventional manner. Electrically insulating hydraulic fluid supply line spider assemblies are provided to hold the hydraulic fluid supply line tube 2 in the center of the jet pump discharge line tube 13, to support the hydraulic fluid supply line tube 2 when assembling and disassembling the machine, to allow the sections of the jet pump discharge line tube 13 to telescope sufficient distance in relation to the hydraulic fluid supply line tube 2 to facilitate assembly and disassembly of the supply line tube 2 and to insulate the supply line tube 2 from the discharge line tube 13. The supply line spider assembly consists of the outer support ring 24 joined to four outer support ring straps 22, in turn joined to four plastic blocks 21, and those in turn support the inner support ring 23. The four insulating plastic blocks 21 are provided to firmly connect to the outer ring straps 22 and to the inner support ring 23 which latter fits loosely and slidably around the supply line tube 2 and slides upward underneath the supply line couplings 15 during assembly and disassembly operations. The outer support ring 24 rests on top of the kelly 15 and loosely fits inside the kelly coupling 14. Each succeeding section of the jet pump discharge line tube 13 and the hydraulic fluid supply line tube 2 is equipped with a similar supply line spider assembly. As many additional sections of discharge line 13 connected by couplings 14 and supply line tube 2 are used as are needed to place the hydraulic sidewall cutting device at the desired depth.

Referring to FIGURE III, it can be seen that attached to the last section of the hydraulic fluid supply line tubing 2 above the sidewall cutting device is an insulating plastic nipple 25; this serves to insulate the metallic fluid supply line tube 2 from the other sections of the machine. Water tight conduits, as 63, are used to shield the electrical wires leading from the supply line coupling 16 above the plastic nipple 25, on down to the sealed sidewall jet valve motor housing 26 and the drilling jet valve motor housing 27 (FIGURE V). Two sidewall jets, 28a and 28b, extend from diametrically opposing sides of the sidewall jet valve assembly 29 and through the walls of the jet pump housing 30. Hydraulic fluid from the supply line tube 2 may pass straight through the sidewall jet valve assembly 29 to supply the pump jet 31 (FIGURE IV) and the drilling jets 32a and 32b (FIGURE VI). The sidewall jet valve motor 33 and gear train 34 apply rotational torque through the valve sleeve torque rod 35 to rotate the valve sleeve 36 towards the ON or OFF position as desired. Where the valve sleeve torque rod 35 passes through the wall of the hydraulic fluid supply line 2, a valve sleeve torque rod seal assembly 38 is provided to prevent leakage. Two sidewall jets 28a and 28b of equal size are used, located 180 degrees apart in order to cancel the reaction thrust of the sidewall jets 28a and 28b and to allow the machine to hang vertically in the well or bore. Pressure seal rings, as 37, are provided where each sidewall jet as 28a passes through the jet pump housing 30 to prevent leakage. The sidewall jets 28 are inserted through the jet pump housing 30 and screw into the sidewall jet valve assembly 29. The sidewall jets as 28a and 28b support the weight of the hydraulic fluid supply line tube 2, hydraulic fluid supply line swivel assembly 1 (FIGURE I), and the high pressure flexible hose attachment to the swivel assembly 1, and cause the hydraulic fluid supply line tube 2 to rotate with the jet pump discharge line tube 13.

Referring to FIGURE IV, it can be seen that the hydraulic fluid supply line tube 2 is bent over against the wall of the jet pump housing 30 and is flattened where it closely approaches, passes, and extends shortly past the jet pump venturi, indicated generally as 39, to decrease the amount of disturbance in the venturi flow pattern.

The venturi tube is formed of a plurality of replaceable central insert cylinder elements, as 39a, 39b, 39c, each with a central cylindrical portion and having an annular flange at each end thereof and such elements firmly secured to each other in series as by compression through the flanges thereof; each such insert element is slidably yet firmly held in a guide support element (39d, 39e, and 39f, respectively) each such guide support element having a central cylindrical portion with terminal flanges at each end thereof. The guide element flanges serve to join such adjacent elements together as by bolts. The guide element flanges have a generally circular outline to provide a slidable fit in the tube 30, with cutaway portions to slidably contact the flattened portion of tube 2 (i.e., the portion facing and closest to the axis of tube 30) and to support such flattened portion of tube 2 when fluid flows therethrough under high pressure. Space is also provided in and through flanges of the guide support elements for conduits, as 41, and other conduits as herein described; the space between the tube 30 and the guide support element cylindrical wall provides a stable support for control means hereinbelow described. The venturi comprises an expansion section composed of two solid pieces, 39g and 39j, and a contraction section 39h formed of one solid piece. These latter sections are firmly bolted to the peripheral guide support elements. Thereby the venturi tube elements may be removed from the tube 30 for assembly, inspection, replacement and adjustment as needed.

Venturi pressure seals 40 are provided to prevent leakage past the venturi (generally indicated as 39) in section 39j and 39h and to prevent accumulation of fine cuttings between the outer wall of the venturi (generally indicated as 39) and the jet pump housing 30. The venturi 39 is firmly positioned in correct relation to the pump jet 31 and then secured firmly as by a plurality of means such as a bolt and strap 39k to the flattened portion of the hydraulic fluid supply line tube 2. After passing through the venturi 39 the hydraulic fluid supply line tube 2 returns to the round configuration makes a 180-degree return bend utilizing the full diameter of the jet pump housing 30 to minimize hydraulic losses and supplies the pump jet 31. The intake port 41 of the cavitation control system is located in the high pressure section of the venturi 39. A feed-back line 42 supplies fluid to the cavitation control valve 43 which meters the fluid into the throat of the venturi 39 through exhaust ports as 44. The pressure at 44 is usually lower than at 41 during operation of the device. Positioning of the cavitation control valve 43 is controlled by the output of a pressure transducer 45 which measures the absolute pressure in the throat of venturi 39. The electrical output of the pressure transducer 45 is used to operate the cavitation control valve motor 46 to increase feedback flow if the absolute pressure in the venturi 39 throat drops below the allowable limits. The exhaust ports 44 discharge the feedback fluid into the venturi 39 throat areas most susceptible to cavitation and in an upward direction, thus aiding the jet pumping action.

Referring to FIGURE V and FIGURE VI, the fluid supply line tube 2 branches to supply hydraulic fluid to the drilling valve 47 which controls the operation of the drilling jets 32a and 32b. The drilling valve 47 is turned to ON (open position) or OFF (closed position) by properly energizing the drilling valve motor 48. Rotational torque is applied to the drilling valve 47 through the drilling motor gear train 49 and the drilling valve torque rod 50. The hydraulic fluid supply line tube 2 leading from the drilling valve 47 branches (FIGURE VI) to supply two drilling jets 32a and 32b. Both drilling jets 32a and 32b extend through the wall of the drilling assembly housing 51. Each of a multiplicity of perforations, as 52, arranged in the walls of the drilling assembly housing 51 at a series of graduated vertical levels, as shown, permits entrance of fluids and cuttings to the suction side of the jet pump. Drag bit lugs as 53a and 53b and 53c are attached to the lower end of the drilling assembly housing 51 to aid in fracturing the harder formations during drilling operations. The drilling assembly housing 51 is equipped with a flange 54 to facilitate attachment to the lower end of the jet pump housing 30. After removal of the drilling assembly housing 51 and the sidewall jets, as 28a and 28b, the sidewall jet valve assembly 29, together with the jet pump equipment can be removed from the jet jump housing 30 as an integral unit.

Referring to FIGURE VII, a diagrammatical illustration of the electrical system for manually controlling the hydraulic sidewall cutting jet motor-valve and the hydraulic drilling jet motor-valve assemblies, it can be seen that the hydraulic fluid supply line tube 2 serves as one conductor and the jet pump discharge line tube 13 as the other conductor in the electrical system. A water tight conduit 63 houses the lead-in wire from the supply line coupling 16 to the sidewall jet valve motor housing 26 located in housing 30 near valve 29 and the drilling jet valve motor housing 27 located in housing 30 near valve 47. An ungrounded D.C. power supply 55 at the surface of the well or bore is used to furnish power to both motor assemblies (33 and 48). A double pole double throw selector switch 56 at the surface of the well or bore allows the operator to selectively operate either the sidewall jet valve motor 33 or the drilling jet valve motor 48. Visual indication of the motor operation is provided to the operator by the center hung ammeter 57 placed in one line on the surface. When the switch 56 is moved to the sidewall jets position a positive D.C. potential is applied through the fluid supply line tube 2, through the rectifier 59, and through the closed contacts of the thermal switch 58 to the sidewall jet motor 33. The forward resistance of the rectifier 59 does not affect the operation of the sidewall jet motor 33. The back resistance of the rectifier 60 in series with the drilling jet valve motor 48 prevents the motor 48 and the thermal switch 58 from operating. When the sidewall jet valve motor 33 begins to run, the four lobed cam 61 carried on the shaft of the gear reduction train 34 turns from a high lobe position and allows the micro-switch 62, sprung to normally close, to close. Twenty seconds after the motor 33 begins to run, the thermal switch 58 opens. When the motor 33 has turned the sidewall jet valve sleeve 36 through ninety degrees rotation, the next lobe on the cam 61 opens the micro-switch 62 and stops the motor 33. A decrease in current flow as indicated by the ammeter 57 tells the operator that the valve has been moved to the new position. When the operator returns the selector switch 56 to the OFF position the heater circuit of the thermal switch 58 is de-energized and the switch 58 begins to cool off. Approximately thirty seconds later, the thermal switch 58 contact is returned to the closed position and the sidewall jet valve motor 33 control circuit is ready for the next operational cycle. The operation of the drilling jet valve motor 48 control circuit is the same as that described here for the sidewall jet valve motor 33 control circuit with the exception that the rectifier 60 is connected oppositely.

Referring to FIGURE VIII, a diagrammatical illustration of the cutting rate control system, it can be seen that an increase in gross weight will cause the jet pump discharge line steel swivel bail 10, which has some elasticity, to spring inward, thus displacing the weight sensing potentiometer 64 and decreasing the resistance across points 64a, 64b, and 64c. Conversely a decrease in gross weight will allow the swivel bail 10 to spring outward, resulting in an increase in the resistance of the weight sensing potentiometer 64 through points 64a, 64b, and 64c. Changes in the resistance of the potentiometer 64 will cause reversals of phase relation in the output of the control bridge 65, at the surface of the well or bore, in relation to the reference voltage 66. The phase relations of the control bridge 65 output in relation to the A.C. reference voltage 66 are chosen to indicate an increase in weight suspended by bail 10 for an out of phase output and a decrease in such weight for an out of phase output and a decrease in such weight for an in phase output. The magnitude of the output signal of the control bridge 65 is directly proportional to the magnitude of the change in gross suspended weight. The control bridge 65 is balanced at the desired operating gross weight by adjusting the resistance of the balancing potentiometer 67. The output signal of the control bridge 65 is amplified by the RC coupled amplifier 68 and applied to the control grids of the discriminator circuit 69. Negative bias is also applied to the control grids of the discriminator circuit 69 by adjusting the dead band potentiometer 70 to the desired output level for desired sensitivity to gross weight. An in phase signal from the control bridge 65 will cause the discriminator circuit 69 to energize the ON relay 71 when it is of sufficient magnitude to overcome the negative bias output of the dead band potentiometer 70 and will turn the sidewall jets ON in response to a decrease in gross weight command. When the ON relay 71 is closed, energizing voltage from the D.C. power supply 55 is applied, through the closed contacts of the selector switch 56 in the sidewall jets position, through the closed contacts of the ON relay 71, through the closed contacts of the thermal switch 58, to the sidewall jet valve motor 33. Operation of the sidewall jet valve motor 33 is exactly the same as previously described. When the sidewall jet valve sleeve 36 has been moved to the ON or open position, shown in FIGURE III, the micro-switch 62 contacts and the thermal switch 58 contacts will be in the open position, preventing further operation of the motor 33. The contacts of the thermal switch 58 are held in the open position by current flow through the thermal switch 58 heater circuit until the gross weight of the machine is increased sufficiently to de-energize the ON relay 71. A further increase in gross weight of the machine will cause an out of phase signal from the control ridge 65 to energize the OFF relay 72 and move the sidewall jet valve sleeve 36 to the closed position in a manner similar to the ON circuit operation previously described. The sidewall jet valve sleeve 36 will remain in the closed position until the gross weight of the machine is decreased sufficiently to cause an in phase signal from the control bridge to energize the ON relay 71 and repeat the cycle. Magnitude of changes in gross weight necessary to operate the circuits are determined by the settings of the dead band potentiometer 70. In initially setting up the cutting rate control circuits for operation, it is necessary to move the selector switch 56 to the sidewall jet position, and operate the manual control switch 73 to move the sidewall jet valve sleeve 36 to the OFF or closed position. The manual control switch 73 is then returned to the open position. With the machine operating on the pumping mode alone (as above described) and the dead band potentiometer 70 set to the desired range of sensitivity, the resistance of the balancing potentiometer 67 is decreased unil an in-phase signal from the control bridge 65 energizes the ON relay 71 and starts the cycle of operation.

Referring to FIGURE IX, a diagrammatical illustration of the fluid level control system, it can be seen that the throttle valve 74 is used to control a diesel engine 75 which powers a high pressure centrifugal pump 76 delivering high pressure hydraulic fluid through a flexible hose to the hydraulic fluid supply line swivel 1 of the under-reaming machine and process.

It might be well to understand here that the diesel engine 75 and the high pressure centrifugal pump 76 are of conventional construction. Advancing or retarding the throttle valve 74 will result in an increase or decrease in the pressure of the hydraulic fluid being supplied to the pump jet 31, which will result in an increase or decrease in the pumping rate of the jet pump. Since the fluid accumulation rate in a well or bore is fairly constant, increasing or decreasing the pumping rate of the jet pump will result in respectively the lowering or raising of the fluid level in the well. If the fluid level in the well rises above the sidewall cutting jets 28a and 28b, the lateral cutting range and rate are reduced to a small fraction of the maximum possible. Lowering the fluid level in the well or bore below the jet pump suction inlet, as at 52, will result in pumping large quantities of air, thus lowering the pumping efficiency of the machine. The fluid level potentiometer assembly 77 measures the fluid level in the well or bore between the side-wall jets 28a and 28b and the jet pump suction and is physically mounted to the outside wall of the jet pump housing 30. The fluid level potentiometer assembly 77 is made up of a series of resistors 78, each of which is paralleled with an astatic gap 79, between closely spaced needle point shaped self-cleaning electrodes, the resistance of which gap is reduced from infinity in the air to almost zero when submerged in fluid in the well or bore. A decrease in resistance of the fluid level potentiometer 77 due to the fluid level rising in the well or bore will result in an in phase signal output from the fluid level control bridge 80 at the surface of the well or bore. This output signal is amplified by the RC coupled amplifier 81 also at the surface and applied to the grids of the discriminator 82 at the surface. When the magnitude of the in phase signal exceeds the negative bias being applied by the dead band potentiometer 85 to the grids of the discriminator 82, the ADVANCE relay 83 will be energized thereby applying a D.C. voltage to the advance winding of the control motor 84. The control motor 84 through the assembled gear train 84g will advance the throttle valve 74 which increases the jet pumping rate and thus decreases the magnitude of the output signal of the fluid level control bridge 80 until the negative bias being applied by the dead band potentiometer 85 de-energizes the ADVANCE relay 83 and stops the control motor 84. The throttle valve 74 remains in this position until the fluid level in the well or bore declines and an out of phase signal from the control bridge 80 energizes the RETARD relay 86 and retards the throttle valve 74. Operation of the RETARD cycle is similar to the ADVANCE cycle previously described. The fluid level in the well or bore can be regulated as desired by adjusting the balancing potentiometer 87 and the dead band potentiometer 85. Opening and closing of the sidewall jet valve assembly 29 will, respectively, result in increasing and decreasing the pressure being applied to the pump jet 31, thus affecting the fluid level in the well or bore. By setting the dead band potentiometer 85 to low values of negative bias the fluid level control system is made to correct changes in supply line 2 pressure caused by opening and closing of the sidewall jet valve assembly 29.

Referring to FIGURE X, a diagrammatical illustration of the jet pump cavitation control system of my invention, the high pressure fluids are fed back from the intake port 41 in the upper end of the venturi 39 through the feedback line 42 and injected into the throat area of the venturi, 39, that is subject to cavitation through the exhaust ports, 44, in a direction aiding the jet pump action. The pressure transducer 45 measures the absolute pressure in the critical area of the venturi 39 throat and positions the pressure potentiometer 88, decreasing resistance as the absolute pressure decreases and causing an out of phase signal output from the control bridge 89. The output signal of the control bridge 89 is amplified by the transistorized RC coupled amplifier 90, and applied to the bases of the transistorized discriminator 91. When the out of phase signal is of sufficient amplitude to overcome the bias applied, the discriminator 91 will produce an output signal. The output of the discriminator 91 energizes the OPEN Relay 92 which applies an A.C. potential to the open line of the A.C. control motor 46 causing that motor to rotate in the correct direction to open the cavitation control valve 43 and thus inject high pressure fluid in increasing amounts into the low pressure areas of the venturi 39 throat as valve 43 continues to open. Injection of high pressure fluid will cause the absolute pressure in the venturi 39 throat to rise, thus increasing the resistance of the pressure potentiometer 88 and decreasing the out of phase output signal of the control bridge 89. When the output signal of the control bridge 89 drops below the bias level applied to the bases of the discriminator 91, the OPEN relay 92 will de-energize and the A.C. control motor 46 will remain in its position until a sufficient change in venturi 39 throat pressure results in another command. The CLOSE relay 93 circuit operation is similar to the operation described here of the OPEN relay 92 operation and serves to close valve 43 and decrease the amount of high pressure fluid injected into the low pressure area of the venturi. The cavitation control system power supply 94 furnishes excitation for the control bridge 89, B minus collector voltage for the RC amplifier 90, biasing voltage for the discriminator 91, excitation for the A.C. control motor 46 and excitation for the discriminator 91 collector transformer 95. Desired operating throat pressures are selected by adjusting the balancing potentiometer 96 and pressure range is selected by adjusting the dead band potentiometer 97, which furnishes bias to the discriminator 91. These adjustments are made prior to lowering the jet pump assembly into the well or bore and must take into consideration the vapor pressure at operating temperature of the hydraulic fluid being used. All components of the cavitation control system are housed in the water tight cavitation control system housing 98 which is located in the recessed area of the venturi 39 outer wall. The feedback line 42 is provided with a removable filter 99 to prevent cuttings from clogging the exhaust ports 44.

Referring to FIGURE XI, a diagrammatical illustration showing the hydraulic flow of the integrated machine, it can be seen that the high pressure centrifugal pump 76 intakes fluid from the suction reservoir 100 through the suction line 101 and discharges fluid to the pressure line swivel 1. The hydraulic fluid supply line 2 delivers the high pressure fluid to the sidewall jets 28a and 28b which direct the fluid against the sidewalls of the well or bore, washing or cutting the formation and returning the cuttings to the jet pump suction 52. Formation fluids 102 also enter the well or bore and move to the jet pump suction openings or perforations 52, aiding the sidewall jet streams in transporting the cuttings. The drilling jets 32a and 32b discharge hydraulic fluid downward to agitate the cuttings that collect in the bottom of the well or bore and return the cuttings to the jet pump suction perforations 52. All fluids and cuttings are then pumped through the venturi 39 by the action of the pump jet 31 and on to the surface through the annular space between the jet pump discharge line tube 13 and the hydraulic fluid supply line tube 2. The fluid and cuttings are carried from the discharge line swivel 5 by the flow line 103 and discharged into the cuttings reservoir 104. Cuttings that settle out in the cuttings reservoir 104 are periodically pumped out of the cuttings reservoir 104 by the reservoir cleaning pump 105. Fluids from the cuttings reservoir flow through the reservoir connection line 106 and into the suction reservoir 100 and, thence, again enter the suction line 101 for recirculation. Excess fluids are discharged through the suction reservoir waste line 107 which maintains the desired fluid level in the suction reservoir 100.

Referring to FIGURE XII, a diagrammatical illustration showing the hydraulic flow of the integrated machine employing liquid hydrocarbons as hydraulic fluid, it will be noted that the major change from the hydraulic flow pattern previously described is the complete pressurization of the entire system and the addition of a distillation reservoir 114. It is necessary to pressurize the system when employing hydraulic fluids that have high vapor pressures at the operating temperature. It is desirable to use liqufied petroleum gases as butane and propane as hydraulic fluid in under-reaming tar sands in order to decrease the viscosity of the tar, sand and hydraulic fluid mixture and to facilitate the separation of the sand from the fluid portion. Once the sand is separated out, the liquified petroleum portion of the hydraulic fluid can be separated from the tar therein by lowering the reservoir pressure below the vapor pressure of the liquified petroleum and separating it out from the remainder of the hydraulic fluid by fractional distillation. The formerly liquified petroleum fraction of the hydraulic fluid at this point is in the gaseous form and is compressed to the liquid form again for recirculation. Liquid petroleum hydraulic fluid compressed and recovered as below described enters the centrifugal pump suction line 101 and is placed under high pressure by the centrifugal pump, 76. The hydraulic fluid is then delivered to the hydraulic fluid supply line swivel and distributed to the sidewall jets 28a and 28b, pump jet 31, and drilling jets 32a and 32b in the same manner as previously described. In order to hold the high vapor pressure hydraulic fluid in the liquid form as it is being discharged by the various jets, it is necessary to maintain a fairly high pressure in the well or bore. The well casing 108 is cemented as at 109 to the walls of the well or bore and extends down the well or bore to the top of the formation to be under-reamed. The annual space between the jet pump discharge pipe tube 13 and the well casing 108 is sealed by a packer seal 110 which is free to move up or down in the well casing 108 and is attached to the jet pump discharge pipe tube 13 just below the kelly 15 assembly. This allows the under-reaming operation to be conducted in the same manner as previously described while maintaining pressure on the well or bore. The packer seal 110 is equipped with a pressure port 111 through which high pressure air or other gases are injected into the well or bore by the conventional pump assembly 112 to increase the pressure in the well or bore the desired amount above the vapor pressure of the hydraulic fluid. Air can be used safely to increase the pressure in the well or bore by maintaining the air to fuel ratio in the well or bore below the combustible range. The jet pump discharges the hydraulic fluid, tar and sand mixture into the pressurized cuttings reservoir 104 where the sand settles to the bottom and the supernatant hydraulic fluid and tar mixture flows through the constant pressure inlet regulator valve 113 into the pressurized distillation reservoir 114. The pressure setting of the regulator valve 113 determines the pressure being maintained within the pressurized cuttings reservoir 104 and is set sufficiently high to maintain the hydraulic fluid in liquid form. Sand from the bottom of the cuttings reservoir 104 is periodically pumped, by the pressure sealed reservoir cleaning pump 105, into the pressurized sand disposal reservoir 120, which is vented via line 122 to the suction of the vapor pump 115, in order to recover the liquified petroleum portion of the hydraulic fluid. The use of adjacent wells, that have previously been under-reamed, as sand disposal reservoirs 120 is within the scope of my invention. The hydraulic fluid and tar mixture is separated in the distillation reservoir 114 by maintaining the pressure within the distillation reservoir 114 below the maximum vapor pressure of the formerly liquified hydrocarbon portion of the hydraulic fluid at the operating temperature and removing the formerly liquified hydrocarbon portion of the hydraulic fluid from the distillation reservoir 114 in the vapor form. This hydrocarbon portion of the hydraulic fluid, in its vapor form, is pumped from the distillation reservoir 114 by the vapor pump 115 which places the vapors of the hydrocarbon portion of the hydraulic fluid under high pressure and pumps the vapors through the heat exchanger 116 where such vapors are condensed to the liquid form. The resulting liquid is forced on into the suction reservoir 100 for recirculation by the centrifugal pump 76. The heat exchanger 116 raises the temperature of the tar and hydraulic fluid mixture in the bottom of the distillation reservoir 114 and lowers the temperature of the fluid entering the suction reservoir 100. The tar that accumulates in the bottom of the distillation reservoir 114 is periodically pumped out by the tar pump 117 into the pressurized tar reservoir 118, which is vented via line 121 back to the suction of the vapor pump 115. In stopping the under-reaming operation when employing liquified petroleum gases as hydraulic fluid, it is necessary to first close the sidewall jets and drilling jets to allow the jet pump to scavenge all fluids and cuttings from the well or bore and to pump the fluid and cuttings into the cuttings reservoir 104. Operation of the jet pump is continued until all the tar present in the cuttings reservoir 104 is transferred into the distillation reservoir 114 by the rinsing action of the clean hydraulic fluid entering the cuttings reservoir 104 from the jet pump. Then the centrifugal pump 76 is stopped and the centrifugal pump suction line valve 119 is closed. The reservoir cleaning pump 105 is operated to transfer all cuttings from the cuttings reservoir 104 into the disposal reservoir 120. By opening the regulator valve 113, the pressure in the well or bore in the hydraulic fluid supply line tube 2 and in the cuttings reservoir is released into the distillation reservoir 114. Operation of the vapor pump 115 is continued until most of the hydrocarbon portion of the hydraulic fluid in the gaseous form throughout the entire system has been condensed to the liquified form and transferred into the pressurized suction reservoir 100, which is of sufficient capacity to hold the entire hydraulic fluid supply. Negligible losses of the hydraulic fluid will be incurred when this system of stopping the under-reaming operation is followed. In starting the under-reaming operation, the pressure regulator valve 113 is set to the pressure desired in the cuttings reservoir 104, the packer seal 110 is placed inside the well casing, and the centrifugal pump line suction valve 119 is opened. With the sidewall jets 28a and 28b and the drilling jets 32a and 32b in the open position, pressure on the system is gradually built up by the centrifugal pump 76, allowing sufficient time for the pressure in the well or bore to rise to the vapor pressure of the hydraulic fluid at operating temperature before applying full operating pressure. Limited operation of the air pump 112 is then used to maintain the pressure in the well or bore the desired amount above the vapor pressure of the hydraulic fluid. The vapor pump 115 is started when the desired fluid level is reached in the cuttings reservoir 104 and the distillation reservoir 114, thus placing the system in full operation.

FIGURE XIII is a diagrammatic side view broken away in part of the hydraulic drilling device employing a hydraulic motor driving a conventional roller bit; it can be seen that the upper end of the hydraulic fluid supply line 2 and the drilling assembly housing flange 54 are of the same configuration used with the drilling device employing drilling jets 32a and 32b and drag bit lugs 53a, 53b, and 53c, thus enabling the operator to attach and use whichever drilling device is most suited to operating conditions. It will also be noted that the same drilling valve 47, drilling valve motor 48, drilling valve motor gear train 49 (FIGURE V) and drilling jet electrical system (FIGURE VII) are used to control the operation of either drilling device. In this configuration of the hydraulic drilling device, the hydraulic fluid supply line 2 supplies hydraulic fluid to the hydraulic motor intake port manifold 123, which distributes hydraulic fluid to intake port 124 throughout 360 degrees rotation of the valve body 125. The valve body 125 is equipped with upper pressure seal 126 between the top of the valve body 125 and the intake port manifold 123 and a lower pressure seal 127 between the bottom of the valve body 125 and the motor cylinder block 128. The valve body 125 is rotated by the roller bit supply line tube 129, which is attached to the exhaust port 130 in valve body 125. High pressure fluid is applied at any one moment by valve 125 only to that number—slightly less than half—of the pistons 131 in the motor cylinder block 128. The thus moved pistons of the apparatus each directs a downward thrust at said moment against the angle drive plate 132 attached to the output shaft 133 and causes the shaft 133 to rotate in a clockwise (as seen from above) direction in relation to the motor cylinder block 128, which is rigidly attached to the drilling assembly housing 140, in turn firmly attached to flange 54. The resultant rotational torque of the output shaft 133 is applied to the roller bit supply line 129 by four driving webs as 134, which attach the shaft 133 to the supply line tube 129. Thus, clockwise rotation of the angle drive plate 132 causes an equal clockwise rotation of the valve body 125; the valve body directs high pressure fluid through the intake port 124 to one half of the pistons such as 131a and exhaust fluid from the other pistons as 131b passes through the exhaust port 130 into the roller bit supply line tube 129. Pistons such as 131b are forced upward to their maximum upward travel by the rotation of the angle drive plate 132 during their exhaust cycle.

The hydraulic motor output shaft 133 is supported by the bearing assembly 135 and bearing rollers such as 135a and 135b which allows the roller bit 136 attached to the roller bit supply line tool joint 141 to be rotated under the heavy loads needed for optimum drilling rates. Exhaust fluid from the hydraulic motor is discharged through the roller bit nozzles, as 137, to clean the teeth of the roller bit cones, as 138a and 138b, and remove the cuttings from the bottom of the well or bore. Fluid and cuttings from the roller bit 136, and any fluid being produced by the well or bore, enter the drilling housing ports, as 139a and 139b, and pass upward through the annular space between the output shaft 133 and the roller bit supply line 129 into the jet pump suction. Rotational velocity of the roller bit 136 is controlled by varying the weight being applied to the roller bit 136. Indication of rotational velocity of the roller bit 136 is furnished the operator by monitoring the hydraulic fluid supply line 2 pressure. Applying more weight to the roller bit 136 will result in an increase in supply line 2 pressure and a decrease in rotational velocity of the roller bit 136. The drilling device employing a hydraulic motor driving a conventional roller bit 136 provides independent rotation of the drilling device, enables the machine to drill through the harder formations, and to drill at large angular deviations from the vertical.

FIGURE XIV is a diagrammatic representation of the method of forming subsurface tunnels according to my invention. For such operation a first well or bore 142 is drilled; it may have a casing as 108a. The jets operating as described in relation to FIGURE XI hereinabove undercut the sidewalls of the well to form a pair of lateral trenches, 142a and 142b, each of great length (about 75–100 feet) in proportion to the width (1–3 feet) whereof. The cuttings are removed also as described in relation to FIGURE XI. The direction of the length of the tunnel or trench is readily controlled from the surface as by marking the pipe to record the alignment of the successive lengths of tubing checking such alignment by checking the reflection action of a mirror mounted uniformly on such tubing by a telescope mounted a substantial distance from said tubing. This may also be used to control the trench width. The height of the trench is controlled by the travel of the machine up and down the kelly as above described.

The slope 143 of the bottom of the trench is, preferably, chosen to provide a rapid removal of the cuttings carried by the hydraulic fluid passing from jets as 28a 28b. A substantially horizontal table level, as shown by 144, preferably is made to form the major part of the floor of the lateral trench 142b; 147 indicates the roof of the trench 142b and 145 indicates the end of that trench formed by undercutting well or bore 142.

According to this process encompassed in the scope of my invention, a second well or bore, 148, is then formed at location relative to bore 142 that is twice the length of the lateral trench 142b distant from bore 142 and lies in the same direction therefrom as does the length of said trench. A pair of long lateral trenches 149a and 149b are formed by under-reaming the walls of bore 148 in the same manner as used and above described to form trenches 142a and 142b. The earth between wall 145 of trench 142b and the wall 150 of trench 149a is broken down to cuttings which are removed as above described to provide continuous passage from the furthest portion of trench 149b to the most distant point therefrom in trench 142a. The floor 144' of trench 149a is made at the same level as the floor 144 of trench 142b. The roof of trench 149a also is made to match that of trench 142b. Some portion of the earth between walls 145 and 150 may be left when the height or width of the trench is substantial and the reinforcemetn provided by such wall is desired.

By control of the elevation of the cutting jets and by rotation of tube 13 (and housing 30) thereby controlling the direction of said jets, trenches as 142a and 142b may may be made of any desired dimensions having regard to the strength of the formation through which formed. The usual height of trenches used in making extended tunnels will be 10 to 20 feet and the usual width of said tunnel will be 8 to 10 feet, the length will be from 70 to 150 feet using ½-inch jets and a 800 p.s.i.g. fluid supply.

In a preferred embodiment of the process of my invention 800 gallons per minute of water (which may contain additives as below described) are pumped via pump 76 at 875 p.s.i.g. to the pressure line swivel 1, a 4-inch inside diameter 1500 p.s.i 800 g.p.m. capacity swivel, the depth of the hole 142 being about 200 feet. However, depth is not a limitation on my process. The kelly 15 permits an up movement of the jets of 7 feet and a down movement of 7 feet for a total vertical travel of 14 feet. The hydraulic fluid line tube 2, above-described, delivers the cutting fluid to and through the 4-inch inside diameter inlet orifice of the valve 29 and, thence, through the cutting jets 28a and 28b. These jets are of 3¼ inch length along the axis with 2 inch internal diameter inlet and ½ inch internal diameter outlet. The interior surface of the jets are circular generations of a hyperbolic curve: this taper provides a linear acceleration of the fluid passing through such jets and a vena contracta of that fluid stream lying in the geometrical projection of the surface of the peripheral surface of tube 13. These jets are formed with a tolerance of plus or minus .001 inch, and being of equal size and positioned in tube 2 diametrically opposite to each other, the reactions due to the thrust resulting from the flow of the two cutting jets balance each other for a net zero sidewards force on tube 13. The velocity of the fluid leaving the orifice 28a is the same as that leaving orifice 28b, and is about 326 feet per second. The above taper of the interior of the jets provides a fluid flow therefrom in the form of a cylinder rather than a cone; the fluid in the stream maintains substantially all its energy (about 90 B.H.P.) at a distance of 100 feet from the tube 13, there being a vertical drop of only about 1½ to 2 feet in 100 feet of travel of such jet. As described below in the discussion of Table II, larger exit diameter, e.g., of ⅝ inch, for jets 28a and 28b allow an increased flow and increased energy in the cutting fluid. It has been, however, found that two ½-inch outlet orifice jets as above described remove about 60 cubic yards per hour of earth formation of the usual consistency and strength met in under-reaming a water producing well or bore while avoiding rupture and sloughing of the walls of the underground trenches or tunnels thus formed and thereby maintaining the integrity of the walls of such tunnels or trenches in such formation. The lower orifice of valve 29 has a three-inch internal diameter and is 7 inches below its upper or inlet orifice. The axial cross section outline of the holes in the valve sleeve (made of mild steel) form a smooth curve with the cross section outline of the interior of the jet. The valve sleeve is hand lapped (to plus or minus 1/100,000 inch as determined by light fringe) to form a smooth fit and allow control of the position thereof by the valve motor 33 (which operates at 11,000 r.p.m. and is rated at 10 oz.-in. torque) and actuates valve 29 (through a total gear reduction of 29,-992). This large orifice valve 29 provides a minimum interference with the flow of fluid therethrough to jet 31;

additionally, the circular outline of the holes in sleeve 36 serve to provide a gradual and balanced introduction and shut-off of fluid flow from the interior of valve sleeve 36 to the jets 28a and 28b which also have circular inlets. The liquid which passes down line 2 and does not pass through jets 28a and 28b flows through pipe 2. The outside radius of curvature of the tube 2 is, as above described, the same as the interior diameter of housing 30 which has the same dimensions as tube 13) and is formed of the same material). The fluid passing through line 2 exits from the ½-inch diameter orifice of jet 31, which jet 31 narrows from the 4-inch inside diameter of pipe 2 over a length of nine inches to provide an interior sectional outline which is hyperbolic and provides to the fluid passing therethrough a linear acceleration therethrough and a final velocity of fluid of 326 feet per second. The shape of the interior of the terminal portion of jet 31 and of the initial portion of the fluid stream exiting therefrom is a cone with an apex 12 inches distant from the orifice of jet 31. Addition of cutting fluid from jets 28a and 28b is controlled so that the fluid collected from the cavity formed by the under-reaming operation and entering perforations 52 is controlled to provide about 30 to 50 percent by volume solid in the pump discharge line 13, such proportion of solid being readily handled by the jet pump 31. This control of portion of solid in said fluid is effected as above described, i.e., the weight of the suspended metal elements (tubes, valves, jets) being known the volume and weight of water (when such is used as the hydraulic fluid) to fill the fluid supply line tube 2 and the jet pump discharge line 13 likewise being known, and the reaction thrust of the jet at any given pressure and volume input to line 2 being known at a substantially constant fluid level in the well or bore, the weight of the cuttings is the difference between the total weight suspended from bail 10 and the known downward thrust factors above-described. The concentration of solid in the discharge line is, of course, the ratio of the volume (weight divided by density) of such solid to the volume (weight divided by density) of liquid therein. The weight suspended from the bail 10 may be measured, and, depending upon the ratio of solid to liquid, determined as above described, the cutting rate adjusted by manual control of valve 29 to lower the cutting rate when the solids content is too high and to raise it when too low and, thereby insure that the removal of the formation by the action of the cutting device does not exceed the solids capacity of the jet pumping device.

Alternatively, and preferably, to accomplish more rapid and delicate and automatic control of the cutting rate, the empirical procedure above described may be used for controlling the desired ratio of solid to liquid in the discharge fluid. In the preferred embodiment, the vertically movable bail 10 is formed of 2-inch diameter forged steel and shaped as shown in FIGURE VIII. The vertical arms of the bail are 12 inches apart from each other and form eyes that support the swivel 5. The two angled portions of the bail are each at 45° to the vertical. The angled positions are joined to each other and to the vertical portions thereof by rounded portions with a central radius of curvature of about 2 inches. Electrical resistance 64 is supported between fixed points on a rigid insulation plate joined pivotally to one vertical arm of bail 10 while the other end of the plate is slidably supported on the other vertical arm. The wiper 64b is pivotally attached to said other vertical arm by a rigid insulation arm which is slidably attached to said aforementioned one vertical arm. Increases of weight on bail 10 cause the wiper 64b to decrease the electric resistance between fixed points 64a and 64c.

The balancing potentiometer 67 is calibrated with such bail 10 and resistance 64, mounted as above, for the total suspended weight corresponding to a desired fluid-solids ratio—usually 35 percent by volume solid—in the discharge line tube 13 at the operating depth—such as 200 feet—of a jet 31 of known diameter—as ½-inch—with a given rate of fluid supply to line 2 at a known pressure—such as 800 g.p.m. at 800 p.s.i.g.—and with a known weight and size of tubing and cutting and jet orifices, as has been above described. The discriminator 69 is set to react as above described to changes in weight, as measured by bail 10 and resistance 64 and wiper 64b, corresponding to permissible variations in the solid-fluid ratio in the discharge fluid in discharge line 13 by calibrating dead band potentiometer 70 with such permissible changes, so as to control such solid-liquid ratios range to within a change of two percent.

In the preferred embodiment, the voltage output of source 55 is 28 volts D.C. while the input thereto is the conventional 115-volt 60-cycle A.C. voltage. Inductors 26a and 27a (FIGURE VII) to the control to motors for valves 47 and 29 block out the A.C. components of the current provided for the fluid level system and the cavitation control system. The reference voltage 66 for the automatic cutting jet control system (FIGURE VIII) is 60-cycle 115-volt A.C.; while supply 94 is powered with 60-cycle 115-volt A.C., cavitation control 98 is provided with an inductor 98b to block out the high frequency (1600-cycle) component of the fluid level control system (FIGURE IX) while capacitator 98b blocks out the D.C. component of the valve control system of FIGURE VII. In the fluid level control system (FIGURE IX) the reference voltage 66a is 28 volts at 1600 cycles from a standard surface power supply therefor. Capacitator 77b is provided in sensing element 77 to block out the D.C. component of the valve motor control system (FIGURE VII) and the 60 cycle component of the cavitation control system (FIGURE X).

The level of the fluid in the well or bore may be measured by a float valve supporting a measuring stick with an index for said stick or by a float which supports a weight and the position of the float is measured on a balanced reel. Accordingly, as the level of fluid in the well or bore is indicated by the above method as having risen to an undesirably high level the supply of fluid to the jet pump may be increased by manual control of valve 74 and, as the level of the fluid in the well or bore is shown to have fallen undesirably the supply of fluid to jet pump 31 is decreased by manual control of valve 74. Alternatively, and preferably, the more delicate and rapid and automatic control of the fluid level control may be effected by the emperical procedure above described, after the balancing potentiometer 87 has been calibrated for a desired fluid level relative to the series of resistors 78 and gaps 79 used for maintaining the desired fluid level. The fluid level of the admixture of cuttings and cutting fluid is, according to my invention, controlled to be maintained below the level of the cutting jets. While a 16-ft. difference in fluid level may be tolerated from the level of the orifice of jet 131 down to the level of the fluid in a cavity as 142a or 142b as generally shown in FIGURE XI, it is preferred that jet 31 be 6 inches below the fluid level of chamber 142b. Additionally, the dead band potentiometer 85 is calibrated for the desired sensitivity of the discriminator 82 which is usually full opening action on valve 74 for a 3-foot drop in fluid level. During this process the drilling jets 32a and 32b may be operated to increase the depth of the well or bore while the jet pump 31 and jets 28a and 28b are operated. The action of jets 28a and 28b may also be discontinued while drilling jets 32a and 32b (for use in relatively soft formations) or the hydraulic roller bit of FIGURE XIII is operated in place of the drilling jets 32a and 32b when harder formations are met.

The venturi (generally indicated as 39) has a total length of 12 feet 7 inches in the preferred embodiment above described. Of this length, 12 inches is provided for the inlet section 39h, 48 inches for the high velocity straight section formed of 9 units exemplified by 39a, 39b, and 39c, and 7 feet 7 inches is provided for the discharge, this portion being formed of two sections, 39g, and 39j. The interior diameter of the cylindrical sections illustrated as 39a, 39b, and 39c is 1½ inches. The section 39h is shaped to have a hyperbolic section in axial cross section outline and provides a uniform acceleration rate to the fluid passing therethrough. There is also a hyperbolic axial cross section outline to the discharge section to provide minimum resistance to flow of liquid therethrough. Intake port 41 of the cavitation control system is located in section 39j, at a point about one inch from the housing 40. This is about as far lateral and downstream as is convenient to contact the highest pressure fluid while allowing convenient machining of feedback line 42. The center of the orifice of pump jet 31 is located from one to two diameters and preferably about 1.5 diameters, i.e., ¾-inch in the case of a ½-inch internal diameter jet orifice, below the vena contracta of venturi 39, i.e., slightly above the junction of sections 39h and 39c of FIGURE IV. The entire pressure sensing and cavitation control unit exclusive of conduit 63 (which supplies electrical energy to the control system in housing 98) fits into housing 98, which is 1 inch x 2½ inches x 2 inches in size. Such unit and housing are firmly attached to the flange of the guide support element or spool, as 39f. It will be noted that the construction of the venturi section support or guide element flanges provide firm reinforcement for the supply line 2 as well as the venturi tube while allowing removal of the venturi tube components for inspection, replacement, and adjustment thereof.

At the high jet velocities used in the jet pump 31 according to my invention (see Table II hereinbelow) the avoidance of cavitation is important not only to maintain the mechanical efficiency of the pumping operation but also to avoid vibration concomitant on the occurance of cavitation and possibility of damage to the instruments and control devices above described located in the housing 30 on development of such vibration or "chatter." The potentiometers 88 and 96 are adjusted to provide for maintaining a minimum pressure in the throat of venturi 39 of about one p.s.i. guage which is usually adequate to avoid cavitation at the conditions of operation in the above-described preferred embodiment of the process using water as the hydraulic fluid. Dead band potentiometer 97 sets the sensitivity at about plus or minus ½ p.s.i. to avoid returning too much high pressure fluid via line 42 and thus interfering with the efficiency of the pumping operation. It will be noted that the cavitation control valve 43 is supplied with fluid from the zone near inlet 41 which is at such substantially higher pressure than exists in the low pressure cylindrical section of the venturi that a substantial flow may be readily attained through said valve in order to transmit pressure to the fluid in said cylindrical section. In the range of velocities met with in operation of the pump jet orifices herein specifically disclosed (see Table II below) the maintenance of such minimum pressure using water as the hydraulic fluid such pressure is usually adequate. It is within the scope of my invention, however, to use materials such as liquid butane and propane commonly known as liquified petroleum gases as the hydraulic liquid; in such instance a substantially higher pressure is maintained in the venturi sufficient to maintain such material in the liquid state at the temperature and velocity conditions there existing. These pressures are well known in the published literature (e.g., Handbook of Physics and Chemistry) to enable the operator to set the control mechanism in housing 98 as above described to maintain a pressure in the cylindrical portion of the venturi of a least 40 p.s.i.g. when 100 percent butane is used and a temperature of 70° F. exists in the venturi (or 70 p.s.i.g. at 105° F.) and to maintain there a pressure of at least 130 p.s.i.g. when liquified propane is used at 70° F. (or 200 p.s.i.g. at 100° F.).

My invention provides a machine and process whereby to greatly increase the flow of water from wells as well as a method of stripping tar sands. The bore 142 in which the tube 13 and housing 30 is sunk may be formed by conventional well drilling techniques, e.g., rotary drilling, which provide bores large enough to house the machines above described. The flow increase in gallons per minute of water provided by this process is illustrated by the following and detailed in Table I: Assuming a 16 inch well and pumping at 75% of capacity with such equilibrium state as results 24 hours after continuous pumping, the increase in gallons per minute from the well or bore effected by providing four trenches as 142a and 142b as shown in FIGURES XI and XIV 100 feet long and 16 inches wide with a tunnel depth of about 10 feet (floor level of 144, ceiling level as 147 on FIGURE XIV) would be as shown in Table I. For purpose of increasing well capacity trenches as 142a and 142b are made about 16 inches wide and have a depth of 10 to 20 feet, with a usual maximum depth of the lower half of the water sand. The slope portion or drain 143 is made of about 1 foot width, i.e., narrower than the full width of the trench, to prevent channeling of the floor 144 and to facilitate carriage of the cuttings to the inlet orifices, as 52, of the jet pump. The aforementioned four tunnels all start at the bore 142. Two of the tunnels 142a and 142b would be in the plane of the paper as shown in FIGURE XI and FIGURE XIV; the other two tunnels would be at right angles thereto; one of these latter is indicated at 142c in FIGURE XI; the other, of course, would project in a line therewith out of the plane of the sheet of drawing; these latter two trenches are formed by rotating the tubing 13 and all parts rigidly connected therewith 90° so as to turn jets 28a and 28b by ninety degrees and direct the stream from said jets (as stream shown as 28c, 28d, and 28e from jet 28a in FIGURE XI) to form another set of trenches such as 142a and 142b but at right angles thereto, in the manner above described for such operation.

The predicted ideal increases in gallons per minute effected by under-reaming four tunnels as above described each 100 feet long and 14 inches wide and 10 feet deep from a 16 inch diameter well over the production of such well when pumping at 75 percent capacity after reaching the steady state provided by 24 hours of continuous pumping are given in Table I. These values are calculated from the formula A:

Formula A:

$$q = \frac{\pi P (D^2 - d^2)}{2.3 \log_{10} (R/r)}$$

where:

$q$ = volume of flow in gallons per minute;
$P$ = permeability;
$D$ = static depth of water in the well;
$d$ = depth of water in the well when pumping;
$R$ = effective radius of well (90% of tunnel length); and
$r$ = initial tunnel radius.

These factors are illustrated in FIGURE XV. Formula A is a standard formula for the flow assuming certain ideal conditions (the formula is developed at pages 75 ff. of Elements of Hydraulic Engineering, by R. K. Linsley, Jr., and J. B. Franzoni, McGraw-Hill Book Co., New York, Toronto and London, 1955—Library of Congress card 55–6160). The values of the Table I are calculated on the approximation that for the approximate volume, V, of the cone of depression, $$V = \frac{\pi R^2 h}{d}$$

where $h=(D-d)$ or $D/2$ for a 75 percent of capacity pumping; for simplifying calculations the cone is approximated as formed by revolution of the straight line T about the center of the well on an axis—instead of by revolution of the more accurate drawdawn curve S—of FIGURE XV.

The specific yield of the formation may be measured by permeameters (as given in pages 74 and 75 and articles there cited of the above cited Linsley and Franzoni text) which is generally about 15–20 percent for the formations usually met in well formations. The assumptions involved in this tabulation are set out in some detail to clarify the basis of the figures set out in that table and so that the benefit as well as breadth of applicability of the result of this process of this invention may be appreciated.

TABLE I.—INCREASE IN OUTPUT OF 16-INCH WELL (PUMPING AT 75% CAPACITY AFTER 24 HOURS CONTINUOUS PUMPING) BY UNDER-REAMING WITH FOUR 100-FOOT TRENCHES RADIATING FROM SAID WELL AT RIGHT ANGLES TO EACH OTHER

| D (ft.) | Present pumping rate (g.p.m.) | | | | | |
|---|---|---|---|---|---|---|
| | 100 | 200 | 300 | 400 | 500 | 600 |
| 20 | 550 | 910 | 1,220 | 1,400 | 1,785 | 2,050 |
| 30 | 620 | 1,020 | 1,370 | 1,680 | 1,950 | 2,260 |
| 40 | 675 | 1,100 | 1,480 | 1,830 | 2,140 | 2,440 |
| 50 | 735 | 1,170 | 1,575 | 1,870 | 2,280 | 2,590 |
| 60 | 770 | 1,230 | 1,650 | 2,040 | 2,365 | 2,730 |
| 70 | 810 | 1,300 | 1,730 | 2,130 | 2,500 | 2,830 |
| 80 | 840 | 1,350 | 1,800 | 2,190 | 2,565 | 2,920 |
| 90 | 885 | 1,400 | 1,860 | 2,290 | 2,660 | 3,060 |
| 100 | 910 | 1,470 | 1,930 | 2,370 | 2,760 | 3,150 |

The above description of the preferred embodiment of the process describes a process developing trenches as 142a and 142b of 100 feet in length with ½-inch diameter jets 28a and 28b and ½-inch diameter jet 31. However, when first beginning to under-ream a new well formation, it is desirable to use a ¼ inch diameter jet for jets 28a and 28b to determine the resistance of the formation to jet action and to determine the desirable cutting rate while minimizing the possibility of collapse of the formation about the equipment above described. Therefore, in order to expedite the cutting action, a proper size jet and input pressure may be chosen from the theoretical data given in Table II (entitled "Jet Characteristics"). The size of jet 31 and the reaction thrust developed thereby at 800 p.s.i. is also given in that table. For purpose of calculating operational horsepower requirements the brake horsepower of such jets is also given in Table II. It has been found that the jets 28a and 28b and 31 used according to my invention herein described have approximately 40 percent mechanical efficiency. The figures of Table II are derived from commonly used hydraulic engineering table (e.g., "Rotary Drilling Handbook," by J. E. Brantley, 1952—fifth edition, Palmer Publications, New York; "Hydraulics for Jet Bits," Hughes Tool Co., Bulletin 2C, revised May 1957; figures 284 and 285, Ladish Catalogue No. 55, 1954, Ladish Co., Cudahy, Wis.).

TABLE II.—JET CHARACTERISTICS

| Jet Diameter (Inch) | Hydraulic H.P. at 800 p.s.i. | Displacement (g.p.m.) at— | | | Reaction Force at 800 p.s.i. | Jet Velocity at 800 p.s.i. |
|---|---|---|---|---|---|---|
| | | 800 p.s.i. | 600 p.s.i. | 400 p.s.i. | | |
| ⅛ | 5.8 | 12.4 | 10.7 | 8.75 | 2,550.0 | 323.5 |
| 3⁄16 | 13.3 | 28.5 | 24.1 | 19.7 | 5,800.0 | 324.1 |
| ¼ | 24.0 | 49.5 | 42.8 | 35.0 | 10,600 | 324.7 |
| 5⁄16 | 36.2 | 77.5 | 67.1 | 54.8 | 1,590.0 | 325.3 |
| ⅜ | 53.5 | 115.2 | 97.3 | 79.5 | 2,355.0 | 326 |
| 7⁄16 | 72.3 | 153.0 | 132.6 | 108.3 | 3,180.0 | 327 |
| ½ | 94.0 | 200.0 | 173.0 | 141.5 | 4,140.0 | 328 |
| 9⁄16 | 118 | 253.5 | 219.0 | 179.0 | 5,200.0 | 329 |
| ⅝ | 148 | 316 | 273.0 | 223.5 | 6,520.0 | 330.0 |
| 11⁄16 | 178 | 381 | 331.0 | 270.0 | 7,840.0 | 330.0 |
| ¾ | 212 | 455.0 | 393.5 | 322.0 | 9,340.0 | 332 |
| 13⁄16 | 252 | 541.0 | 467.0 | 382 | 11,000 | 334.0 |
| ⅞ | 292 | 626.0 | 550.0 | 450 | 12,850.0 | 335.0 |
| 15⁄16 | 340 | 728.0 | 620.0 | 513 | 14,950.0 | 337.5 |

In connection with Table II, it should be noted that the hydraulic HP of a ½-inch jet as 31 satisfactorily pumps from a depth of 200 feet at 800 p.s.i. while a 15⁄16 inch jet 31 delivers 1600 g.p.m. from a 500-foot depth. The fluid used on the above discussion is water; when increased well production is desired no additives are used in the water in order to minimize interference with the permeability of the formation being under-reamed. However, in tunneling operations, where permeability is not ordinarily a factor, colloidal clay, starch or gelling agents may be used separately or in combination to increase the capacity of the fluid to carry the cuttings from and through the trench and up the discharge tube 13 and so expedite the cutting operation.

Further to explain the details of the procedure of my invention following are sample calculations using the above described preferred embodiment of apparatus according to my invention and the information hereinabove.

With a well of 100 feet depth and an initial yield of 200 g.p.m. and an expected (as outlined above) maximum yield of 600 g.p.m. and a 100-foot length of cut (from housing 30 to wall 145) with sidewall cutting jets of ½ inch inside diameter orifice, ⅜-inch inside diameter orifice drilling jets (as determined by the resistance of the formation) and using a maximum pressure of 800 p.s.i. the pumping capacity required will be the sum of Gallons per minute
(a) Fluid yield of _____ 600
(b) Sidewall jet _____ 400
(c) Drilling jets _____ 225

Total of _____ 1,225

The horsepower (H.P.) needed to pump the volume of fluid will be 31 actual H.P. from the following:

$$H.P. = \frac{1225 \text{ g.p.m.} \times 835 \text{ lbs./gal.} \times 100 \text{ ft.}}{33,000 \text{ ft. lbs./min./H.P.}}$$

The hydraulic horsepower would be correspondingly greater because of the 40% mechanical efficiency of the jet pump or 77.5 H.P. The required gallons per minute are (77.5 g.p.m. × 800 p.s.i./1714 = about 165 g.p.m. at 800 p.s.i. The proper size pump jet is, as above shown, ½-inch inside diameter. This will provide a maximum ascending velocity of $$\frac{25 \times \text{g.p.m.}}{D^2 - d^2} = 375 \text{ ft./min.}$$

which velocity carries ¼-inch diameter cuttings to the surface. Ascending velocity of the jet pump discharge fluids can be increased as needed by controllably injecting additional water into the well from the suction reservoir 100.

It is to be understood that the form of my invention, herewith shown and described, is to be taken as preferred examples of the same, and that various changes in the shape, size and arrangement of parts may be resorted to, without departing from the spirit of my invention, or the scope of the subjoined claims.

I claim:

1. A device for under-reaming a well and digging an underground tunnel comprising a vertically movable support at the surface, rotatably supported therefrom underground a substantially rigid housing containing a plurality of outwardly directed cutting jets, a valve in said housing, a fluid supply line in said housing operatively connected to said jets through said valve, an underground pump for directing fluid upward through said housing, said pump having an outlet, said outlet being located in said housing and below said jets, and said pump operatively connected to said inlet line, and a control means for said pump and said cutting jets being located at the surface.

2. A device as in claim 1 additionally comprising a rotary drilling device rotatably supported from said housing and rotatable with respect thereto and operatively connected to said fluid supply line and the inlet to said pump is above the bottom of said drilling device actuated by fluid provided by said fluid supply line.

3. Apparatus as in claim 1 comprising also fluid level sensing means, an inlet to said pump, said fluid level sensing means being located between said jets and said inlet, control means operatively connected to said fluid supply line and said fluid level sensing means being operatively connected to said control means for said fluid supply line.

4. A device for under-reaming a well and digging an underground tunnel comprising a vertically movable weight sensing suport at the surface, rotatably supported therefrom underground a substantially rigid housing containing a plurality of outwardly directed cutting jets, a fluid supply line in said housing operatively connected to said jets through a valve, an underground pump for directing fluid upward through said housing, a control means for said pump and said cutting jets being located at the surface, and control means for said pump actuated by said weight sensing support.

5. In a device for under-reaming a well and draining fluid therefrom, a tube provided with a plurality of openings along its length, said openings each extending from the interior of said tube through to the exterior of said tube to said well, each of said openings being provided with a valve body actuated by a motor in said tube and each of said motors being selectively controlled, at least one of said valve bodies having an exterior surface which is a surface of revolution having its axis parallel to the length of the tube and around which axis that valve rotates, said valve body having a first axial passageway therethrough, said valve body containing an orifice which matches an opening along the length of said tube and which opening connects with said first axial passageway to provide a conduit from said openings to said passageway.

6. A device as in claim 5 wherein said device comprises a plurality of valves and valve bodies therefor, each of said valve bodies being actuated by an electric motor and the electric motor for each valve is actuated by a different characteristic electric current, all the current of different characteristics are supplied by the same two conductors and means are provided for separately imposing said electric currents of different characteristic on said conductors.

7. In a device for under-reaming a well and draining fluid therefrom, a tube provided with a plurality of openings along its length, said openings each extending from the interior of said tubing through to the exterior of said tube to said well, each of said openings being provided with a valve body actuated by a motor in said tube and each of said motors being selectively controlled by energy transmitted at least in part through said tube to said motor, at least one of said valve bodies having an exterior surface which is a surface of revolution having its axis parallel to the length of the tube and around which axis that valve rotates, said valve body having a first axial passageway therethrough whose cross sectional area is a major portion of the cross sectional area of said tube, said valve body containing diametrically opposing orifices which match a pair of diametrically opposed openings along the length of said tube and which connect with said first axial passageway to provide a conduit from said openings to said passageway.

8. A device as in claim 7 wherein the said device comprises a plurality of valves and valve bodies therefor, each of said valve bodies being actuated by an electric motor and the electric motor for each valve is actuated by a different characteristic electric current, all the currents of different frequency are supplied by the same conductors and means for separately imposing said electric currents of different characteristic on said conductors.

References Cited by the Examiner

UNITED STATES PATENTS

| 2,127,265 | 8/1938 | Martin | 251—133 |
| 2,376,974 | 5/1945 | Miller | 175—24 |
| 2,412,765 | 12/1946 | Buddrus et al. | 166—7 |
| 2,678,203 | 4/1954 | Huff | 175—213 |
| 2,720,381 | 1/1955 | Quick | 175—422 X |
| 2,745,647 | 5/1956 | Gilmore | 175—422 X |

FOREIGN PATENTS 631,094  10/1949  Great Britain.

CHARLES E. O'CONNELL, *Primary Examiner.*

JACOB L. NACKENOFF, *Examiner.*

R. E. FAVREAU, *Assistant Examiner.*